(12) United States Patent
Faust et al.

(10) Patent No.: US 12,135,571 B2
(45) Date of Patent: Nov. 5, 2024

(54) CONTROL SYSTEM FOR CONTROLLING FILLING BASED ON LOAD WEIGHT

(71) Applicant: Deere & Company, Moline, IL (US)

(72) Inventors: Jeremy J. Faust, Grimes, IA (US); Kellen O'Connor, Clive, IA (US)

(73) Assignee: Deere & Company, Moline, IL (US)

( * ) Notice: Subject to any disclaimer, the term of this patent is extended or adjusted under 35 U.S.C. 154(b) by 875 days.

(21) Appl. No.: 17/223,457

(22) Filed: Apr. 6, 2021

(65) Prior Publication Data

US 2022/0312678 A1  Oct. 6, 2022

(51) Int. Cl.

| | |
|---|---|
| *G05D 9/00* | (2006.01) |
| *B60P 1/00* | (2006.01) |
| *B65G 67/04* | (2006.01) |
| *G05D 9/12* | (2006.01) |
| *A01B 69/00* | (2006.01) |
| *A01D 41/127* | (2006.01) |
| *A01D 87/00* | (2006.01) |
| *A01D 90/02* | (2006.01) |

(Continued)

(52) U.S. Cl.
CPC ................ *G05D 9/00* (2013.01); *B60P 1/00* (2013.01); *B65G 67/04* (2013.01); *G05D 9/12* (2013.01); *A01B 69/001* (2013.01); *A01B 69/004* (2013.01); *A01D 41/1275* (2013.01); *A01D 87/0038* (2013.01); *A01D 90/02* (2013.01); *B65G 67/24* (2013.01); *G01F 22/00* (2013.01); *G01F 23/292* (2013.01); *G01G 19/10* (2013.01); *G06F 7/70* (2013.01); *G06T 7/62* (2017.01); *G06T 15/08* (2013.01)

(58) Field of Classification Search
CPC .... G05D 9/00; G05D 9/12; G06F 7/70; G06T 7/62; G06T 15/08; G01G 19/10; G01F 22/00; B65G 67/24; B65G 67/04; B60P 1/00; A01D 9/02; A01D 87/0038; A01D 41/1275; A01B 79/005; A01B 69/004; A01B 69/001
See application file for complete search history.

(56) References Cited

U.S. PATENT DOCUMENTS

| | | | |
|---|---|---|---|
| 6,263,039 B1* | 7/2001 | Ducharme | G01G 19/08 377/9 |
| 7,537,519 B2* | 5/2009 | Huster | A01D 43/087 414/397 |

(Continued)

FOREIGN PATENT DOCUMENTS

| | | |
|---|---|---|
| EP | 3053428 B1 | 8/2017 |
| EP | 3289852 A1 | 3/2018 |

(Continued)

OTHER PUBLICATIONS

Extended European Search Report and Written Opinion issued in European Patent Application No. 22161194.0, dated Aug. 18, 2022, in 07 pages.

(Continued)

*Primary Examiner* — Arpad Fabian-Kovacs
(74) *Attorney, Agent, or Firm* — Christopher J. Volkmann; Kelly, Holt & Christenson, PLLC.

(57) ABSTRACT

A receiving vehicle is automatically identified and the number of times it is filled is automatically counted. Control signals can be generated based on the number of times the receiving vehicle is filled.

20 Claims, 13 Drawing Sheets

(51) Int. Cl.
  *B65G 67/24* (2006.01)
  *G01F 22/00* (2006.01)
  *G01F 23/292* (2006.01)
  *G01G 19/10* (2006.01)
  *G06F 7/70* (2006.01)
  *G06T 7/62* (2017.01)
  *G06T 15/08* (2011.01)

(56) References Cited

U.S. PATENT DOCUMENTS

| | | | |
|---|---|---|---|
| 7,894,961 B2 | 2/2011 | Blackburn et al. | |
| 8,649,940 B2 | 2/2014 | Bonefas | |
| 9,119,342 B2 | 9/2015 | Bonefas | |
| 9,792,739 B2 * | 10/2017 | Thomsen | G01C 19/02 |
| 11,390,263 B2 | 7/2022 | O'Connor et al. | |
| 2010/0108188 A1 * | 5/2010 | Correns | A01D 43/087 |
| | | | 141/83 |
| 2011/0066337 A1 * | 3/2011 | Kormann | A01D 43/087 |
| | | | 701/50 |
| 2013/0045067 A1 * | 2/2013 | Pickett | G05D 1/0244 |
| | | | 414/345 |
| 2014/0237868 A1 * | 8/2014 | Whitchurch | G01G 19/083 |
| | | | 37/413 |
| 2015/0264866 A1 | 9/2015 | Foster et al. | |
| 2020/0239244 A1 * | 7/2020 | Hendricks | B60P 1/283 |
| 2022/0361404 A1 * | 11/2022 | O'Connor | G06T 7/62 |

FOREIGN PATENT DOCUMENTS

| | | | | |
|---|---|---|---|---|
| EP | 3939405 A1 * | 1/2022 | | A01B 69/008 |
| EP | 4101286 A1 * | 12/2022 | | A01D 43/073 |
| WO | WO-2015148363 A1 * | 10/2015 | | A01B 69/004 |
| WO | WO-2017205406 A1 * | 11/2017 | | A01B 69/008 |

OTHER PUBLICATIONS

Automated License Plate Readers (ALPRs) Most recently updated Aug. 28, 2017, 10 pages.
Weigh Stations, Apr. 2010, 7 pages.
All Traffic Solutions, Aug. 2018, 20 pages.
Windmill Software Ltd., Vehicle Sensing: Ten Technologies to Measure Traffic, Jun. 27, 2019, 6 pages.

* cited by examiner

CONTROL SYSTEM FOR CONTROLLING FILLING BASED ON LOAD WEIGHT

FIELD OF THE DESCRIPTION

The present description relates to mobile work machines. More specifically, the present description relates to controlling filling mechanisms when filling a receiving vehicle.

BACKGROUND

There are a wide variety of different types of mobile work machines such as agricultural vehicles and construction vehicles. Some vehicles include harvesters, such as forage harvesters, sugar cane harvesters, combine harvesters, and other harvesters, that harvest grain or other crop. Such harvesters often unload into carts which may be pulled by tractors or semi-trailers as the harvesters are moving. Some construction vehicles include vehicles that remove asphalt or other similar materials. Such machines can include cold planers, asphalt mills, asphalt grinders, etc. Such construction vehicles often unload material into a receiving vehicle, such as a dump truck or other vehicle with a receiving vessel.

As one example, while harvesting in a field using a forage harvester, an operator attempts to control the forage harvester to maintain harvesting efficiency, during many different types of conditions. The soil conditions, crop conditions, and other things can all change. This may result in the operator changing control settings. This means that the operator needs to devote a relatively large amount of attention to controlling the forage harvester.

At the same time, a semi-truck or tractor-pulled cart is often in position relative to the forage harvester (e.g., behind the forage harvester or alongside the forage harvester) so that the forage harvester can fill the truck or cart while moving through the field. In some current systems, this requires the operator of the forage harvester to control the position of the unloading spout and flap so that the truck or cart is filled evenly, but not overfilled. Even a momentary misalignment between the spout and the truck or cart may result in hundreds of pounds of harvested material being dumped on the ground, or elsewhere, rather than in the truck or cart.

The receiving vehicle often has more freedom to move relative to the harvester than the harvester has to slow down or speed up due to crop unloading. Thus, some operators of the receiving vehicle currently attempt to adjust to the harvester so that the receiving vehicles are filled evenly, but not overfilled.

Other harvesters such as combine harvesters and sugar cane harvesters, can have similar difficulties. Also, construction vehicles can be difficult to operate while attempting to maintain alignment with a receiving vehicle.

The discussion above is merely provided for general background information and is not intended to be used as an aid in determining the scope of the claimed subject matter.

SUMMARY

A receiving vehicle is automatically identified and the number of times it is filled is automatically counted. Control signals can be generated based on the number of times the receiving vehicle is filled.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
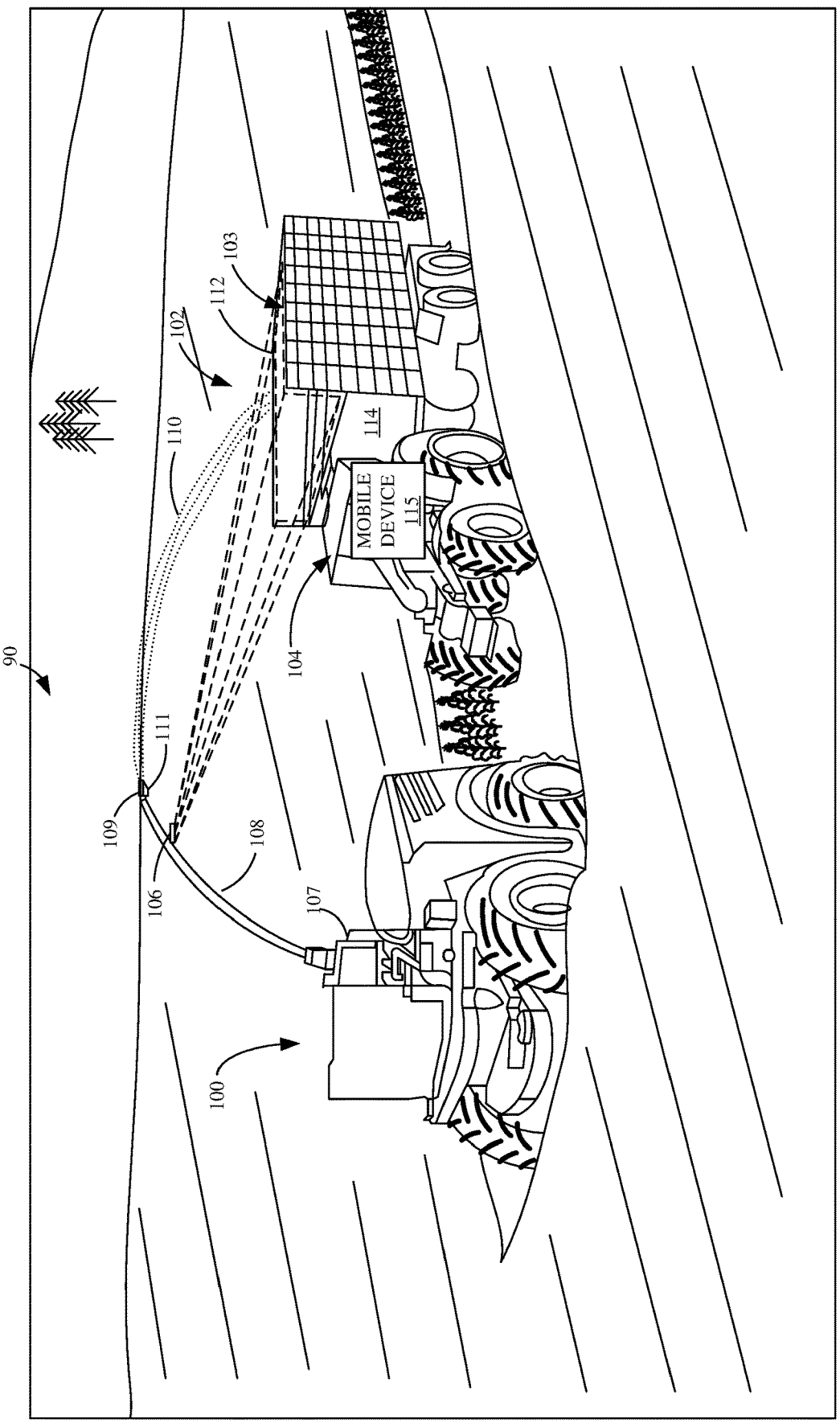
FIG. 1 is a pictorial illustration of one example of a work machine which comprises a forage harvester filling a receiving vehicle, with the receiving vehicle in a position behind the forage harvester.

The present discussion proceeds with respect to a material loading vehicle being an agricultural harvester, but it will be appreciated that the present discussion is also applicable to material loading systems in which the material loading vehicle is a construction machines or other material loading vehicle as well, such as those discussed elsewhere herein. As discussed above, it can be very difficult for an operator to maintain high efficiency in controlling a harvester, and also to optimally monitor the position of the receiving vehicle. This difficulty can even be exacerbated when the receiving vehicle is located behind the forage harvester, so that the forage harvester is executing a rear unloading operation, but the difficulty also exists in side-by-side unloading scenarios.

It may also be desirable to count the number of times each receiving vehicle has been loaded during a harvesting operation over a load count window. The load count window may be a field, a day, a shift, etc. The number of loads for each receiving vehicle can be used, for example, to know the amount of material that was hauled. However, because both the operator of the receiving vehicle and the operator of the harvester are preoccupied with the harvesting operation, itself, and with performing the positioning of the vehicles and filling mechanisms, it can be difficult and cumbersome for the operators to maintain an accurate count of the number of times that each different receiving vehicle has been filled. Similarly, there may be multiple harvesters operating in a single field and a receiving vehicle may be filled by both of those harvesters during a given harvesting operation. This can make it even more difficult to the track the number of times that a receiving vehicle was filled.

In addition, the weight of the material in each load in a receiving vehicle may also be important. The various individuals involved in the harvesting operation may be compensated based upon the tonnage of material that is hauled by the receiving vehicles. Further, some of the receiving vehicles may have weight limits that are either placed on them by the manufacturer of the receiving vehicle, or by the owners of the receiving vehicle. By way of example, the owner of a receiving vehicle may not wish to overload the receiving vehicle in order to reduce wear on the receiving vehicle. Similarly, there may be weight restrictions on the roads over which the receiving vehicle travels from the harvester to a destination where the receiving vehicle is unloaded. For instance, in the United States, depending upon the particular state and federal laws, many receiving vehicles may not exceed 80-100 tons when traveling on highways. Exceeding this weight limit can result in large fines.

However, the operators of the harvester and the receiving vehicle may not always know the weight of the material that is in the receiving vehicle. This is because the harvesting operation may take place at a location that is a long distance from a scale. Thus, it is not uncommon for a receiving vehicle to be weighed once each day, and then have that weight be assumed for subsequent loads in the receiving vehicle, during the harvesting operation. This, of course, is inaccurate. Over the day, the crop conditions (e.g., moisture conditions) can change especially in hot or windy weather. Therefore, the weight of each load in a receiving vehicle, even though the volume of the material in the receiving vehicle is the same, may vary significantly.

Also, even if the crop conditions do not change during the day, the operator of the harvester must remember the fill level to which the receiving vehicle was filled, when it was weighed, in order to repeatably fill the receiving vehicle to that fill level, so that the weight is accurate. Again, this can be difficult because the operator of the harvester often fills multiple different receiving vehicles, different types of receiving vehicles, different sizes of receiving vehicles, etc. Because the operators of the harvester and receiving vehicle do not know the weight of material in the receiving vehicle, they can tend to underfill the receiving vehicle to ensure that the weight restrictions (either on the receiving vehicle or on the roads over which they travel, or other restrictions) are not exceeded. This can result in the receiving vehicles being underfilled and underweight, which reduces the efficiency of the harvesting operation.

In order to assist the operator of the harvester, some automatic cart filling control systems have been developed to automate portions of the filling process. One such automatic fill control system uses an image capture device, such as a stereo camera, on the spout of the harvester to capture an image (a static image or video image) of the receiving vehicle. An image processing system determines dimensions of the receiving vehicle and the distribution of the crop deposited inside the receiving vehicle. The system also detects crop height (or fill level) within the receiving vehicle, in order to automatically aim the spout toward empty spots and control the flap position to achieve a more even fill, while reducing spillage. Such systems can fill the receiving vehicle according to a fill strategy (such as front-to-back, back-to-front, etc.) that is set by the operator or that is set in other ways.

In addition, some current harvesters are provided with a machine synchronization control system. The harvester may be a combine harvester so that the spout is not movable relative to the frame of the harvester during normal unloading operations. Instead, the relative position of the receiving vehicle and the combine harvester is changed in order to fill the receiving vehicle as desired. Thus, in a front-to-back fill strategy, for instance, the position of the receiving vehicle, relative to the combine harvester, is changed so that the spout is first filling the receiving vehicle at the front end, and then gradually fills the receiving vehicle moving rearward. In such an example, the combine harvester and receiving vehicle may have machine synchronization systems which communicate with one another. When the relative position of the two vehicles is to change, the machine synchronization system on the combine harvester can send a message to the machine synchronization system on the towing vehicle to nudge the towing vehicle slightly forward or rearward relative to the combine harvester, as desired. By way of example, the machine synchronization system on the combine harvester may receive a signal from the fill control system on the combine harvester indicating that the position in the receiving vehicle that is currently being filled is approaching its desired fill level. In that case, the machine synchronization system on the combine harvester can send a "nudge" signal to the machine synchronization system on the towing vehicle. The "nudge", once received by the machine synchronization system on the towing vehicle, causes the towing vehicle to momentarily speed up or slow down, thus nudging the position of the receiving vehicle forward to rearward, respectively, relative to the combine harvester.

However, these types of systems do not assist the operator in counting the number of times a particular receiving vehicle was filled or in accurately estimating the weight of material in the receiving vehicle. Thus, these types of systems can still result in the receiving vehicles being underfilled or overfilled (so that they exceed the desired weight limits).

The present discussion thus proceeds with respect to a system which can use a camera or other sensor on the harvester, along with associated image processing functionality, to identify a receiving vehicle (or a type of receiving vehicle) that is being filled by the harvester. Once the identity of the receiving vehicle is known, then when it is full, a set of fill data can be generated for the receiving vehicle. The fill data can include a count of the number of times the receiving vehicle has been filled during the current load count window (e.g., during the current harvesting operation, during the current day, during the current shift, in the current field, etc.). The fill data can also include the fill level of the receiving vehicle for each. The fill data can include the estimated or measured weight in the receiving vehicle as well. The fill data for the receiving vehicle can then be transmitted to another system where it can be used in various ways.

In another example, the present description also proceeds with respect to a system that not only identifies the receiving vehicle and the fill level of the receiving vehicle, but also generates or uses a model that represents a correlation between the receiving vehicle and its fill level, and a weight of material in the receiving vehicle. For instance, in one example, the receiving vehicle can be identified and filled. The receiving vehicle can then be taken to a scale and weighed and a weight value indicative of the weight of material in the receiving vehicle can be sent to the harvester (or the other system) using a mobile device or in other ways. A model generator can then generate a correlation that can be used to estimate the weight of material, given the identity of the receiving vehicle and its fill level. Therefore, during subsequent operations when that same receiving vehicle is identified and its fill level is known, the system can access the correlation to also estimate the weight of material in the receiving vehicle. The system can also consider other parameters to increase the accuracy of the estimated weight, such as the sensed crop moisture or other parameters or crop attributes.

FIG. 1 is a pictorial illustration showing one example of a self-propelled forage harvester 100 (a material loading vehicle) filling a tractor-pulled grain cart (or receiving vehicle) 102. Cart 102 thus defines an interior that forms a receiving vessel 103 for receiving harvested material through a receiving area 112. In the example shown in FIG. 1, a towing vehicle (e.g., a tractor) 104, that is pulling grain cart 102, is positioned directly behind forage harvester 100 and has a mobile device 115 which may be a smart phone, tablet computer, etc. either mounted in the operator compartment of tractor 104, or carried by the operator of tractor 104. Also, in the example illustrated in FIG. 1, forage harvester 100 has a camera 106 mounted on the spout 108 through which the harvested material 110 is traveling. The spout 108 can be pivotally or rotationally mounted to a frame 107 of harvester 100. Camera 106 can be a stereo-camera or a mono-camera that captures an image (e.g., a still image or video) of the receiving area 112 of cart 102. In the example shown in FIG. 1, the receiving area 112 is defined by an upper edge of the walls of cart 102.

When harvester 100 has an automatic fill control system that includes image processing, as discussed above, the automatic fill control system can gauge the height of harvested material in cart 102, and the location of that material. The system thus automatically controls the position of spout 108 and flap 109 to direct the trajectory of material 110 into the receiving area 112 of cart 102 to obtain an even fill throughout the entire length and width of cart 102, while not overfilling cart 102. By automatically, it is meant, for example, that the operation is performed without further human involvement except, perhaps, to initiate or authorize the operation.

For example, when executing a back-to-front automatic fill strategy the automatic fill control system may attempt to move the spout and flap so the material begins landing at a first landing point in the back of vessel 103. Then, once a desired fill level is reached in the back of vessel 103, the automatic fill control system moves the spout and flap so the material begins landing just forward of the first landing point in vessel 103. This continues until the vessel 103 reaches a desired fill level.

It can be seen in the example of FIG. 1 that the camera 106 can capture an image of a portion of the cart 102. For instance, it can capture an image of the forward portion 114 of cart 102. Thus, in one example, optical or visual features of that forward portion 114 of cart 102 can be used by an image processor to uniquely identify cart 102, or to identify the type of the cart 102. A unique cart identifier, or type identifier, can be used to automatically identify a weight limit for cart 102 which may be set manually or downloaded from a manufacturer database or obtained in other ways. In addition, a correlation can be generated for cart 102 so that the weight of material in cart 102 can be estimated using the correlation and the current fill level of material in cart 102. In this way, fill data can be automatically generated for cart 102 that identifies the number of times cart 102 is filled, as well as the fill level and weight of each fill. Additional sensor data can also be used in generating the correlation and/or estimating the weight, such as crop moisture, and/or other attributes or parameters. This fill data can be automatically generated without the operator needing to interact with the automatic cart filling control system to input settings corresponding to the cart 102. Also, the operator can be alerted, or the filling operation can be automatically controlled, when the weight of material in the cart 102 approaches or meets the weight limit or restriction corresponding to cart 102.

Figure 2:
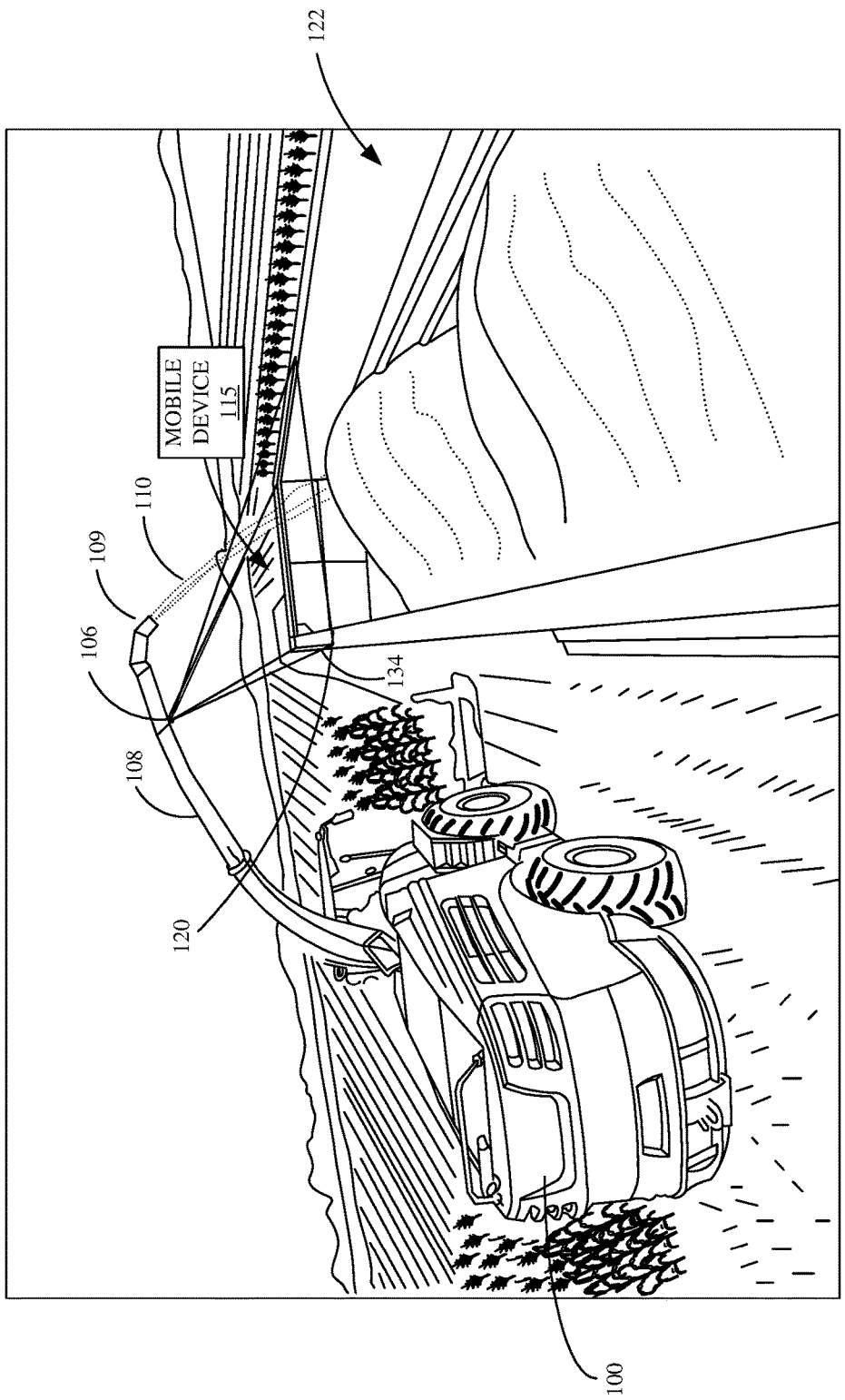
FIG. 2 is a pictorial illustration of one example of a work machine which comprises a forage harvester filling a receiving vehicle that is alongside the forage harvester.

FIG. 2 is a pictorial illustration showing another example of a self-propelled forage harvester 100, this time loading a semi-trailer (or receiving vessel on a receiving vehicle) 122 in a configuration in which a semi-tractor (that also has a mobile device 115) is pulling semi-trailer 122 alongside forage harvester 100. Therefore, the spout 108 and flap 109 are positioned to unload the harvested material 110 to fill trailer 122 according to a pre-defined side-by-side fill strategy. Again, FIG. 2 shows that camera 106 can capture an image (which can include a still image or video) of semi-trailer 122. In the example illustrated in FIG. 2, the field of view of camera 106 is directed toward the receiving area 120 of trailer 122 so that image processing can be performed to identify a landing point for the harvested material in trailer 122 and the height of material in trailer 122. An automatic fill control system can thus control spout 108 and flap 109 to fill trailer 122 as desired.

Also, in the example shown in FIG. 2, it can be seen that camera 106 can be positioned to have a field of view that captures an image of a side portion 134 of trailer 122. Thus, the visual or optical features of the side portion 134 of trailer 122 can be used to uniquely identify trailer 122, or at least to identify the type of the trailer 122. Based on the unique trailer identifier or the type identifier, the settings values for the automatic cart filling control system can be obtained so that the cart is filled in a cart-specific way or in a cart type-specific way, depending upon whether the cart is uniquely identified or the cart type is identified. For example, once the cart or cart type is identified, the fill data can be generated by automatically counting the number of times the particular trailer 122 has been filled, the fill level of each fill and the actual or estimated weight of each fill. A correlation for this trailer or trailer type can be accessed so that once the trailer is identified and the fill level is detected the weight of the material in the trailer can be estimated. The correlation can account for other sensed attributes, such as crop moisture or other attributes.

In other examples, where machine 100 is a combine harvester, it may be that the spout 108 is not moved relative to the frame during normal unloading operations. Instead, the relative position of the receiving vehicle 102, 122 and the combine harvester is changed in order to fill the receiving vehicle 102, 122 as desired. Thus, if a front-to-back fill strategy is to be employed, then the relative position of the receiving vessel, relative to the combine harvester, is changed so that the spout is first filling the receiving vessel at the front end, and then gradually fills the receiving vessel moving rearward. This is just one example.

Figure 3:
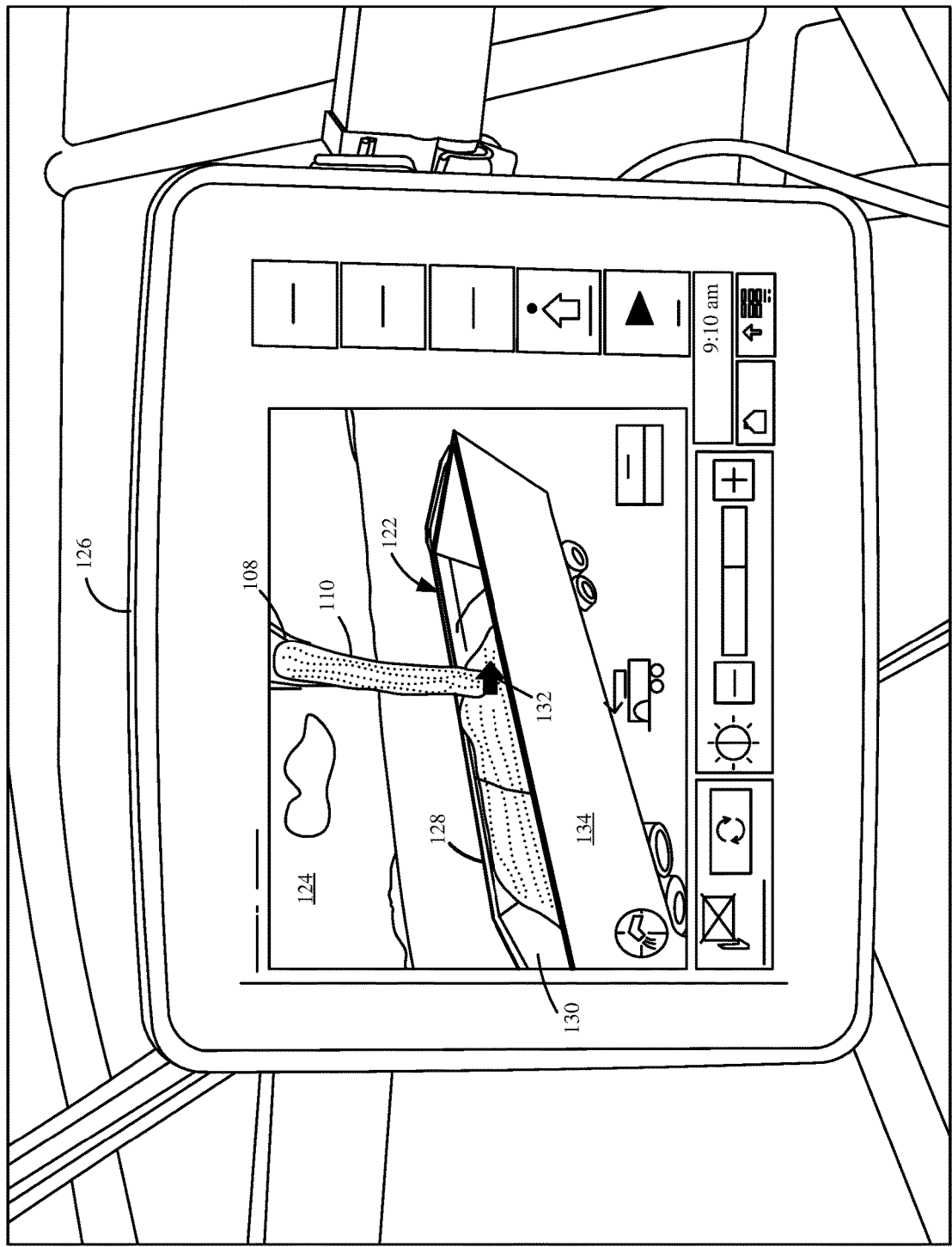
FIG. 3 is a pictorial illustration of an operator display showing video of a filling operation.

FIG. 3 is a pictorial illustration showing one example of an operator interface display 124 that can be displayed on a display mechanism 126, for the operator in an operator compartment of forage harvester 100. The display (or portion of it) can also be sent to the mobile device 115 for use by the operator of the receiving vehicle or towing vehicle (tractor 104 or the semi-tractor). The operator interface display 124 in FIG. 3 shows a view of images (static or video) captured by camera 106. The image(s) show material 110 entering trailer 122. An image processing system on harvester 100 illustratively identifies the perimeter of the opening 128 in trailer 122 and also processes the image of the material 110 in trailer 122 to determine the fill height relative to opening 128. The perimeter-defining opening 128 can be visually enhanced by overlaying a visual overlay over the opening 128 so that the operator can easily identify the opening 128, as it is being recognized by the image processing system.

It should also be noted that, in an example, in which forage harvester 100 has an automatic fill control system (or active fill control system) which fills trailer 122 according to a fill strategy (such as a back-to-front fill strategy, front-to-back fill strategy, etc.), a current location indicator (such as indicator 132) may be displayed to show the current location where material 110 is being loaded into trailer 122 through spout 108 and the direction that spout 108 is, or should be, moving relative to trailer 122 as the filling operation continues. It can be seen in FIG. 3, for instance, that indicator 132 is an arrow pointing in the front-to-back direction. The location of arrow 132 on the representation of trailer 122 indicates the current fill position, while the direction of the arrow 132 indicates the direction that spout 108 will be moved relative to trailer 122 in executing the selected front-to-back fill strategy.

Figure 4:
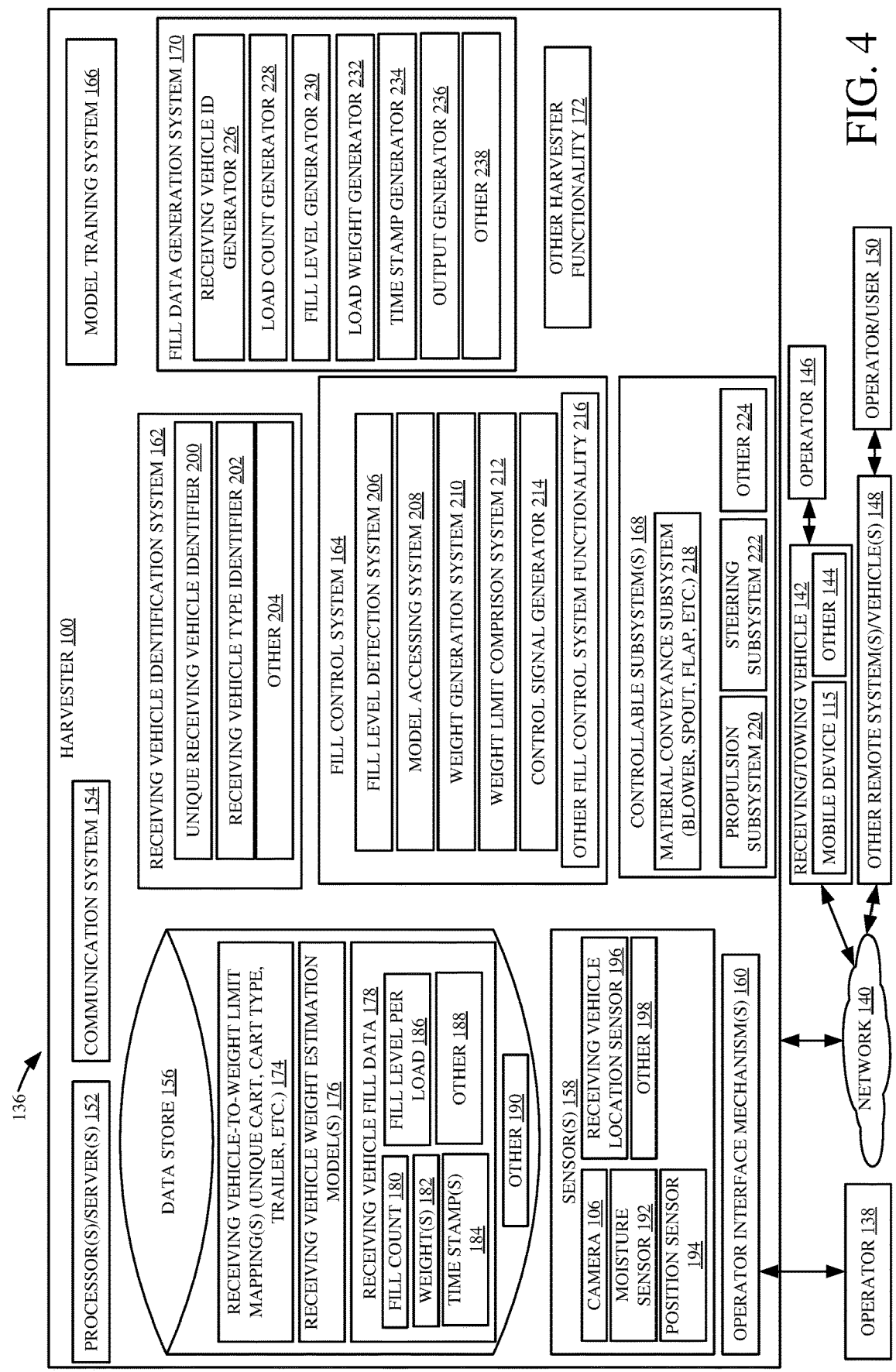
FIG. 4 is a block diagram of one example of a harvester in a material loading system.

FIG. 4 is a block diagram of one example of a material loading system 136. Material loading system 136 includes (as a material loading vehicle) harvester 100 that can be operated by an operator 138. FIG. 4 also shows that harvester 100 can be connected over network 140 to receiving/towing vehicle 142 (which may be a semi-tractor and trailer 122, tractor 104 and cart 102, or another receiving/towing vehicle). Receiving/towing vehicle 142 can include mobile device 115 or other items 144 and can be operated by an operator 146. FIG. 4 also shows that harvester 100 can be connected over network 140 to other remote systems or vehicles 148 that are located remotely from harvester 100 (such as in the same field, in a different field, or at another location). In some examples, other remote systems or vehicles 148 can be operated by an operator or user 150. For instance, where a remote system or vehicle 148 is a farm manager computing system, then the remote user 150 may be a farm manager. Where the remote system of vehicle 148 is another harvester, then operator 150 may be the operator of that harvester. These are examples only and other remote systems/vehicles 148 and operators/users 150 can be employed in system 136.

Network 140 can be any of a wide variety of different types of networks, depending upon the type of communication that is desired. For instance, network 140 can be wide area network, a local area network, a near field communication network, a WIFI network, a cellular network, a Bluetooth network, or any of a wide variety of other networks or combinations of networks.

In the example shown in FIG. 4, harvester 100 illustratively includes one or more processors or servers 152, communication system 154, data store 156, sensors 158, operator interface mechanisms 160, receiving vehicle identification system 162, fill control system 164, model training system 166, controllable subsystems 168, fill data generation system 170, and other harvester functionality 172.

Data store 156, itself, can include one or more receiving vehicle-to-weight limit mappings 174. Mappings 174 map a unique cart or semi-trailer or other receiving vehicle, or a cart type to a corresponding weight limit. The weight limit can be downloaded from a remote system (such as a manufacturer's website), or the weight limit can be input by operator 138 or the operator 146 of the receiving/towing vehicle 142, or it can be input in other ways.

Data store 156 can also include receiving vehicle weight estimation models 176. Models 176, in one example, receive a fill level corresponding to a receiving vehicle and generate an estimated weight value indicative of the weight of the material in that receiving vehicle, based on the identity of the receiving vehicle and based on the fill level. The estimated weight value may be the estimated combined weight of the receiving vehicle and the material in the receiving vehicle and/or the estimated weight of just the material in the receiving vehicle. Models 176 can also account for other crop characteristics or attributes, such as moisture level, or other attributes. Also, as described elsewhere, models 176 can instead be equations or mappings or other types of items that indicate a correlation between the fill level of a particular receiving vehicle or type of receiving vehicle and the weight of the material in that receiving vehicle.

Data store 156 can also include receiving vehicle fill data 178. Fill data 178 is illustratively a set of fill data records where each data record corresponds to a particular receiving vehicle or type of receiving vehicle. Therefore, fill data 178 can include fill count 180 which indicates the number of times that the corresponding receiving vehicle or type of receiving vehicle has been filled for a particular load count window (e.g., for a harvesting operation, for a day, for a shift, for a field, etc.). Weights 182 identify the actual or estimated weights for each fill and time stamps 184 are generated to indicate the time when the receiving vehicle was filled. Data 178 can also include fill level per load data 186 which indicates how full the receiving vehicle was filled during each fill. Data 178 can include a wide variety of other data 188 as well. Data store 156 can also include other items 190.

Sensors 158 can include camera 106, moisture sensor 192, position sensor 194, receiving vehicle location sensor 196, and other sensors 198. Moisture sensor 192 illustratively senses the moisture level of the harvested crop. Position sensor 194 is illustratively a sensor that provides the geographic location of harvester 100 within a global or local coordinate system. Therefore, position sensor 194 can be a global positioning system (GPS) receiver, another type of global navigation satellite system (GNSS) receiver, a dead reckoning sensor, a cellular triangulation sensor, or any of a wide variety of other position sensors. Receiving vehicle location sensor 196 illustratively senses the location of receiving vehicle 142. For instance, sensor 196 may be a RADAR sensor, a LIDAR sensor, an optical sensor, or another sensor that identifies the position of the receiving vehicle 142 relative to harvester 100.

Operator interface mechanisms 160 can include a wide variety of different types of mechanisms. For instance, mechanisms 160 can include a steering wheel, joysticks, pedals, levers, linkages, buttons, switches, etc. In addition, mechanisms 160 can include mechanisms that provide outputs to operator 138 and receive inputs from operator 138. Therefore, mechanisms 160 can include a display screen that displays actuators that can be actuated by operator 138 using a touch gesture, a point and click device, or other mechanisms. Similarly, mechanisms 160 can include a microphone and speaker where speech recognition and speech synthesis functionality (or other audio functionality) is provided. Mechanisms 160 can also include a wide variety of other audio, visual, and haptic mechanisms that can provide information to operator 138 and receive inputs from operator 138.

Communication system 154 enables communication among the various items on harvester 100, and over network 140. Therefore, communication system 154 can include a controller area network—CAN bus control system, and other communication systems that enable communication over network 140. Thus, the type of communication system 154 may depend on the type of networks 140 over which it is to communicate.

Receiving vehicle identification system 162 illustratively identifies the receiving vehicle (or the type or receiving vehicle) that harvester 100 is filling. Thus, system 152 includes unique receiving vehicle identifier 200, receiving vehicle type identifier 202, and other items 204. Unique receiving vehicle identifier 200 uniquely identifies the receiving vehicle, whereas receiving vehicle type identifier 202 identifies the type of receiving vehicle, though not necessarily the unique receiving vehicle itself.

Identifiers 200 and 202 can be any of a wide variety of different types of identification systems that operate based on sensor inputs. For instance, where camera 106 captures one or more visual features or markers on the receiving vehicle 142 that is being filled, then identifiers 200 and 202 can include image processing systems that recognize the optical features or markers captured by the images from camera 106 and identify the receiving vehicle 142, or the type of receiving vehicle, based upon those recognized optical features or markers. As one example, identifiers 200 and 202 may recognize the optical features or markers and access a library of visual features or markers (such as a library stored in data store 156 or elsewhere) to identify the particular receiving vehicle 142 or type of receiving vehicle based upon the recognized optical features or markers. Where a corresponding entry does not exist in the library, then receiving vehicle identification system 162 can recognize that the receiving vehicle 142 is one that has not been encountered before and for which no library entry exists. In that case, receiving vehicle identifications system 162 can create an entry corresponding to this set of recognized optical features or markers, so that this receiving vehicle 142 can be identified in the future.

Identifiers 200 and 202 can identify the receiving vehicle 142 in other ways as well. For instance, it may be that the receiving vehicle 142 has a transmitter that transmits its identity, during operation. In that case, a sensor 158 may sense the transmission and provide a signal indicative of the identity of the receiving vehicle 142 to receiving vehicle identification system 162. These and other mechanisms for identifying the receiving vehicle 142 can be used as well.

Fill control system 164 can be used to illustratively control the position of spout 108 and/or flap 109 relative to the receiving vessel in the receiving vehicle 142 to control the filling operation. Fill control system 164 may be an automated fill control system (or active fill control system) which automatically controls the position of the spout 108 and flap 109 relative to the receiving vehicle 142 to fill the receiving vehicle 142 according to a predefined fill strategy (such as back-to-front, front-to-back, etc.). In another example, fill control system 164 may be a machine synchronization control system which sends control signals to the towing vehicle to change the relative position of the towing vehicle, relative to the harvester 100 in order to fill the receiving vessel in the receiving vehicle 142 as desired. Fill control system 164 may be a manually operated system in which operator 138 manually controls the position of the spout 108 and flap 109 relative to the receiving vehicle 142 in order to fill the receiving vehicle 142 according to a desired fill strategy.

For purposes of the present discussion, it will be assumed that fill control system 164 receives one or more images (static images or video) from camera 106 and automatically detects the fill level of material in the receiving vehicle 142 and may then estimate the weight of the material in the receiving vehicle 142 and can generate an output indicative of that weight. The output can be a control signal that automatically controls the fill operation when the weight approaches a weight limit for the receiving vehicle 142, or the output can be a control signal to control and operator interface mechanism 160 to alert the operator. These and other features are contemplated herein.

For purposes of the present discussion, fill control system 164 includes fill level detection system 206, model accessing system 208, weight generation system 210, weight limit comparison system 212, control signal generator 214 and other fill control system functionality 216. Fill level detection system 206 can be an image processor that detects the height of the material 110 in the receiving vehicle 142 to thus detect the fill level of material in the receiving vehicle 142. System 206 provides an output indicative of the detected fill level. Model accessing system 208 receives an input from receiving vehicle identification system 162 identifying the receiving vehicle 142 that is being filled. Model accessing system 208 then accesses the receiving vehicle weight estimation model 176 (or other correlation) corresponding to the identified receiving vehicle 142. Weight generation system 210 then uses the model 176 for the identified receiving vehicle 142, along with the fill level output by fill level detection system 206 to generate an estimate of the weight of material in the receiving vehicle 142. It will be noted that weight generation system 210 can also obtain the crop moisture from moisture sensor 192 and use that as model input when estimating the weight of the material.

Weight limit comparison system 212 also receives an output from receiving vehicle identification system 162 indicating the identity of the receiving vehicle 142. Weight limit comparison system 212 then accesses the receiving vehicle-to-weight limit mappings 174 to obtain a weight limit corresponding to the identified receiving vehicle 142. System 212 compares the current weight of the material in the receiving vehicle 142 against the weight limit and provides an output indicative of that comparison. Control signal generator 214 generates control signals based upon the output of weight limit comparison system 212. For instance, control signal generator 214 can generate control signals to control a display in operator interface mechanisms 160 to display the current weight of the material in the receiving vehicle 142. Control signal generator 214 can also generate control signals to generate an alert as the current weight of material in the receiving vehicle 142 approaches the weight limit corresponding to the receiving vehicle 142. Control signal generator 214 may also generate control signals to control one or more of the controllable subsystems 168 as well.

Controllable subsystems 168 can include a material conveyance subsystem 218 which may include such things as a blower, spout 108, flap 109, etc. that are used to convey the harvested material from harvester 100 to the receiving vehicle 142. Controllable subsystems 168 can also include propulsion subsystem 220, steering subsystems 222 and other controllable subsystems 224. Therefore, when the weight of the material in the receiving vehicle 142 reaches or exceeds the weight limit corresponding to that receiving vehicle 142, control signal generator 214 may generate control signals to control propulsion subsystem 220 to stop harvester 100, and also to control material conveyance subsystems 218 to stop conveying additional material to the receiving vehicle 142.

When a receiving vehicle 142 has been filled, or during the fill operation, fill data generation system 170 can generate fill data corresponding to that receiving vehicle 142. Thus, system 170 can generate records and store them as receiving vehicle fill data 178 in data store 156. System 170 can also control communication system 154 to send the fill data to other systems/vehicles 148 or other places over network 140.

Fill data generation system 170 illustratively includes receiving vehicle ID generator 226, load count generator 228, fill level generator 230, load weight generator 232, time stamp generator 234, output generator 236, and other items 238. Receiving vehicle ID generator creates a receiving vehicle ID entry in a fill data record and assigns or obtains an identifier for the receiving vehicle 142. Load count generator 228 adjusts the load count corresponding to this receiving vehicle 142. For instance, each time this receiving vehicle 142 is filled, load count generator 228 increments the load count to indicate an additional fill for this particular receiving vehicle 142. Fill level generator 230 enters the fill level corresponding to this fill operation, for this receiving vehicle 142, in the fill data, and load weight generator 232 generates an entry indicating the estimated or actual load weight for this fill. For instance, it may be that the receiving vehicle 142 is intermittently taken to a scale and weighed. In that case, the mobile device 115 on the receiving vehicle 142 (or one used by a scale operator) may be used by the operator of the receiving vehicle 142 to transmit the weight back to harvester 100 so that the actual weight can be recorded by load weight generator 232. In another example, the load weight generator 732 generates an entry indicating the estimated load weight that is estimated by weight generation system 210. Time stamp generator 234 generates an entry in the fill data indicative of the time when the fill was completed, and output generator 236 generates an output indicative of the fill data record that was just created for this receiving vehicle 142, for this particular fill operation. Output generator 236 can generate control signals to control data store 156 to store the new fill data record as receiving vehicle fill data 178. Output generator 236 can also generate control signals to control communication system 154 to output the fill data record over network 140 as well.

Model training system 166 can generate and update or train a model 176 for each unique receiving vehicle 142 or type of receiving vehicle. For instance, where a model 176 does not exist for a particular receiving vehicle 142, or type of receiving vehicle, then model training system 166 receives an identifier from receiving vehicle identification system 162 and determines that no model exists for this particular receiving vehicle 142. Model training system 166 then automatically creates or instantiates a model 176 and obtains the fill level from fill level detection system 206, once the receiving vehicle 142 has been filled. Model training system 166 may then prompt operator 138 or operator 146 to indicate that an actual weight is needed in order to complete the generation of the model 176 for this particular receiving vehicle 142, or type of receiving vehicle. Model training system 166 thus waits for an input indicative of the measured weight. Again, the actual weight can be received from a mobile device 115 once the receiving vehicle is weighed at a scale. The weight can be received from a scale operator through another mobile device or another computing system, or the model training system 166 can receive the actual weight that may be input by operator 138, once operator 138 becomes aware of the actual weight of material in the receiving vehicle 142 (e.g., operator 138 may receive a communication from operator 146 or the scale operator, or another device or person indicating the actual measured weight).

Once the identity of the receiving vehicle 142 (or receiving vehicle type is received and) the fill level for that receiving vehicle 142 and the weight of that receiving vehicle (once filled) are also received, then model training system 166 can generate a model 176 or other correlation that correlates the fill level for this particular receiving vehicle 142 to a weight. Then, in the future, when this particular receiving vehicle 142 is seen (or identified by system 162), the fill level can be obtained and the model 176 for this receiving vehicle 142 can be used to estimate the weight of the material in the receiving vehicle 142.

It will also be noted that, in some examples, model training system 166 can train the model based on other criteria, such as crop moisture, or other sensed crop attributes. In addition, it may be that a receiving vehicle is weighed on a scale more than once during a harvesting operation. In that case, once a model has been initially trained for this receiving vehicle 142, if any additional actual weights are measured for the receiving vehicle 142, those weights can be provided to model training system 166, along with the identity of the receiving vehicle and the fill level for which the weight was taken. Model training system 166 can then retrain or modify the model or correlation corresponding to that receiving vehicle 142 to include the second or subsequent actual weight measure. In this way, model training system 166 can improve the accuracy of the models 176 or correlations corresponding to the receiving vehicles, based upon actual data.

Figure 5:
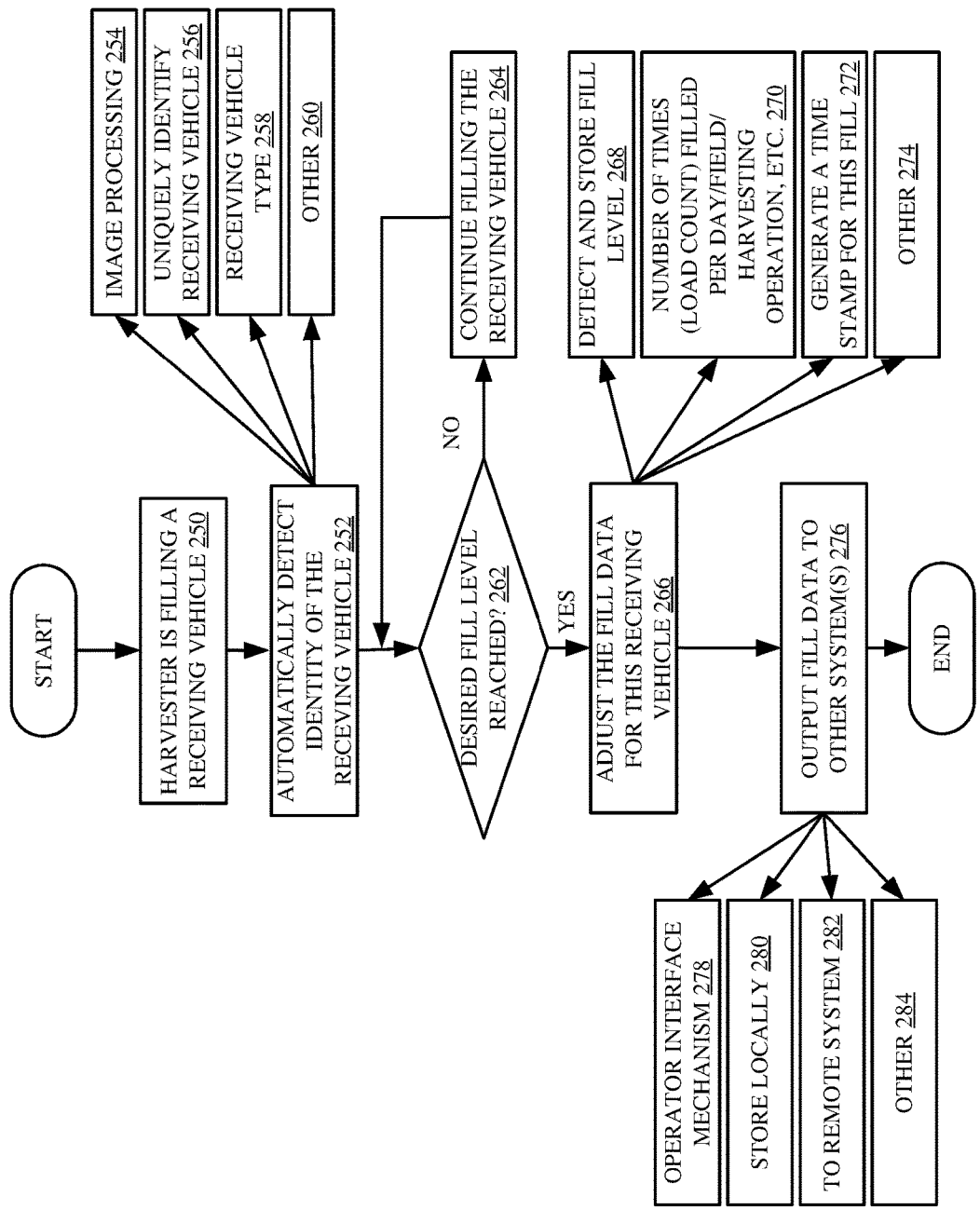
FIG. 5 shows a flow diagram illustrating one example of identifying a receiving vehicle sand counting fills for the receiving vehicle.

FIG. 5 is a flow diagram illustrating one example of the operation of harvester 100 in automatically identifying a receiving vehicle that is being filled, and automatically updating a fill count for that receiving vehicle.

It is first assumed that harvester 100 is filling a receiving vehicle 142. For purposes of the present discussion, assume that harvester 100 is filling trailer 102, that is being towed by tractor 104. Having harvester 100 filling receiving vehicle 102 is indicated by block 250 in the flow diagram of FIG. 5.

Receiving vehicle identification system 162 then automatically detects the identity of the receiving vehicle 102, as indicated by block 252. As discussed above, receiving vehicle identification system 162 can be an image processing system that processes images from camera 106 that show optical features or markers on trailer 102. Identifying the receiving vehicle 102 using image processing is indicated by block 254 in the flow diagram of FIG. 5. Unique receiving vehicle identifier 200 may uniquely identify the receiving vehicle 102, as indicated by block 256. Having receiving vehicle type identifier 202 identify the receiving vehicle type is indicated by block 258. The receiving vehicle type may be a make and model of receiving vehicle 102, the size of receiving vehicle 102, or other type information. The receiving vehicle 102 can be automatically identified in other ways as well, as indicated by block 260.

Fill level detection system 206 then detects the fill level in receiving vehicle 102 and determines whether a desired fill level is reached, as indicated by block 262 in the flow diagram of FIG. 5. The desired fill level may be a default level, it may be set by an operator, downloaded or otherwise obtained for this specific receiving vehicle 102, etc. Filling continues, as indicated by block 264, until receiving vehicle 102 is filled to its desired level.

Once receiving vehicle 102 is filled to its desired level, fill data generation system 170 generates or adjusts the fill data for this receiving vehicle 102, as indicated by block 266. In one example, fill level generator 230 receives an indication of the fill level from fill level detection system 206 and stores that fill level in the fill data record being generated or adjusted by system 170. Detecting and storing the fill level is indicated by block 268 in the flow diagram of FIG. 5. Load count generator 228 increments to the number of times (the load count) that this particular receiving vehicle 102 has been filled. The total number of counts can be aggregated over a load count window, such as per day, per field, per harvesting operation, etc. Increasing the load count is indicated by block 270 in the flow diagram of FIG. 5. Time stamp generator 234 generates a time stamp corresponding to the fill data, as indicated by block 272. Other fill data can be generated as discussed in greater detail elsewhere, and as indicated by block 274 in the flow diagram of FIG. 5.

Output generator 236 then outputs the fill data to other systems, as indicated by block 276. Output generator 236 can generate control signals to provide the output to operator 138 through operator interface mechanisms 160, as indicated by block 278. Output generator 236 can generate control signals to control data store 156 to store the record as vehicle fill data 178, as indicated by block 280 in the flow diagram of FIG. 5. Output generator 236 can generate control signals to control communication system 154 to output the fill data to other systems, such as a towing vehicle 104, or other remote systems and vehicles 148, as indicated by block 282. The fill data can be output in other ways as well, as indicated by block 284.

Figure 6:
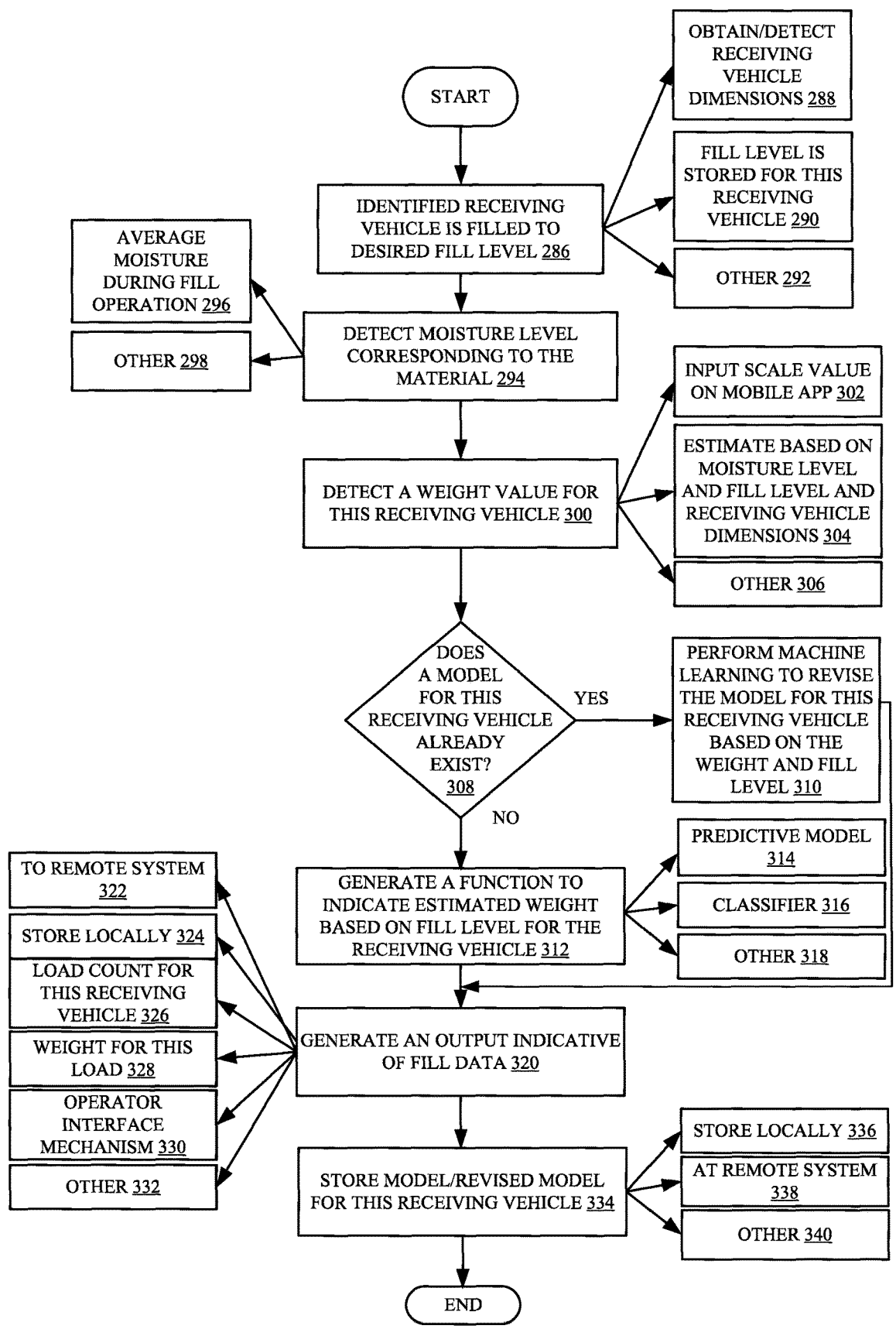
FIG. 6 is a flow diagram showing one example of model generation.

FIG. 6 is a flow diagram illustrating one example of the operation of model training system 166 in generating and/or training a model corresponding to a particular receiving vehicle 102 or type of receiving vehicle. It is first assumed that an identified receiving vehicle 102 (which has been identified by receiving vehicle identification system 162) is filled to a desired fill level as indicated by block 286. Model training system 166 can also obtain or detect the receiving vehicle dimensions. For instance, once the receiving vehicle 102 is identified, the dimensional specifications for that vehicle 102 can be obtained from a manufacturer's website, or from data store 156 (if they have been previously downloaded), or they can be obtained from a manual input by operator 138, or in other ways. Similarly, model training system 166 may include an image processing system that can calculate the dimensions of the receiving vehicle 102 based on images received from camera 106, or in other ways. Obtaining and detecting the receiving vehicle dimensions is indicated by block 288 in the flow diagram of FIG. 6.

Once the receiving vehicle 102 is filled, the fill level detected for this receiving vehicle 102 can then be stored either locally in model training system 166 or data store 156, or remotely in a remote system 148. Storing the fill level for this receiving vehicle 102 is indicated by block 290 in the flow diagram of FIG. 6. Detecting that the current fill operation is complete (e.g., that the identified receiving vehicle is filled to a desired fill level) can involve other operations and be done in other ways as well, as indicated by block 292.

In one example, when the model being generated by system 166 accounts for crop moisture, then model training system 166 obtains the detected crop moisture level corresponding to the material that is loaded into the receiving vehicle 102. For instance, system 166 can receive an input from moisture sensor 192. Detecting the moisture level is indicated by block 294 in the flow diagram of FIG. 6. The moisture level can be the average detected moisture level during the fill operation so that the moisture level value represents the average moisture value of the material in the receiving vehicle 102. Detecting the average moisture value is indicated by block 296 in the flow diagram of FIG. 6. The moisture level can be detected in other ways as well, as indicated by block 298.

Once the fill level for the receiving vehicle 102 has been detected, model training system 166 detects a weight value for this receiving vehicle 102, indicative of the weight of the material in the receiving vehicle 102. Detecting a weight value is indicated by block 300 in the flow diagram of FIG. 6. The weight value can be measured on a scale and provided through a mobile application (such as a mobile application on a mobile device used by the scale operator, a mobile application on mobile device 115 used by the towing vehicle driver, etc.) as indicated by block 302. Also, instead of receiving the measured weight value from a scale, the weight value used to train a model 176 for receiving vehicle 102 can be estimated. For instance, where the dimensions of the receiving vehicle 102 are obtained, then the weight value can be estimated based on the moisture level of the crop, the fill level, and the receiving vehicle dimensions. By way of example, if the receiving vehicle 102 dimensions are obtained, then the volume of the receiving vehicle 102 can be calculated. Using that volume and the fill level, the volume of material in the receiving vehicle can be calculated as well. Given the moisture level of the material, and some correlation between moisture level, volume and weight (which may be a default correlation), then the weight of the material in the receiving vehicle 102 can be estimated as well. Estimating the weight of the material based on the moisture level, the fill level, and the receiving vehicle dimensions is indicated by block 304. The weight value can be detected and obtained in other ways as well, as indicated by block 306.

If a model 176 for this receiving vehicle 102 already exists, as determined at block 308, then model training system 166 performs machine learning to update or revise the model for the receiving vehicle 102 based upon the weight and the fill level, as indicated by block 310. However, if, at block 308, a model for the current receiving vehicle 102 does not already exist, then model training system 166 generates a function or other correlation to indicate the estimated weight of the material based upon the fill level for the receiving vehicle 102, as indicated by block 312. The function or correlation can be a predictive model, as indicated by block 314, a classifier, as indicated by block 316, or another type of function or correlation as indicated by block 318. It will be noted that the function or correlation can also account for other attributes, such as crop moisture, etc.

Fill data generation system 170 also generates fill data, even while the model training system 166 is training or generating a model. Generating an output indicative of the fill data is indicated by block 320 in the flow diagram of FIG. 6. The output can be provided to remote systems 148, as indicated by block 322, or stored locally, as indicated by block 324. The output can include the load count for this receiving vehicle 102, as indicated by block 326 as well as the weight for this particular load, as indicated by block 328. The output can be provided through operator interface mechanisms 160, as indicated by block 330, or in other ways, as indicated by block 332.

Model training system 166 then stores the model that it has just generated or revised, for this particular receiving vehicle 102 or type of receiving vehicle, as indicated by block 334. Again, the model can be stored locally as an estimation model 176, and as indicated by block 336 in the flow diagram of FIG. 6. The model can be stored at a remote system 148, as indicated by block 338, or the model can be stored in other ways, as indicated by block 340. The model can then be retrieved and used to estimate weight the next time the receiving vehicle 102 (or the same type of receiving vehicle) is being filled.

Figure 7A:
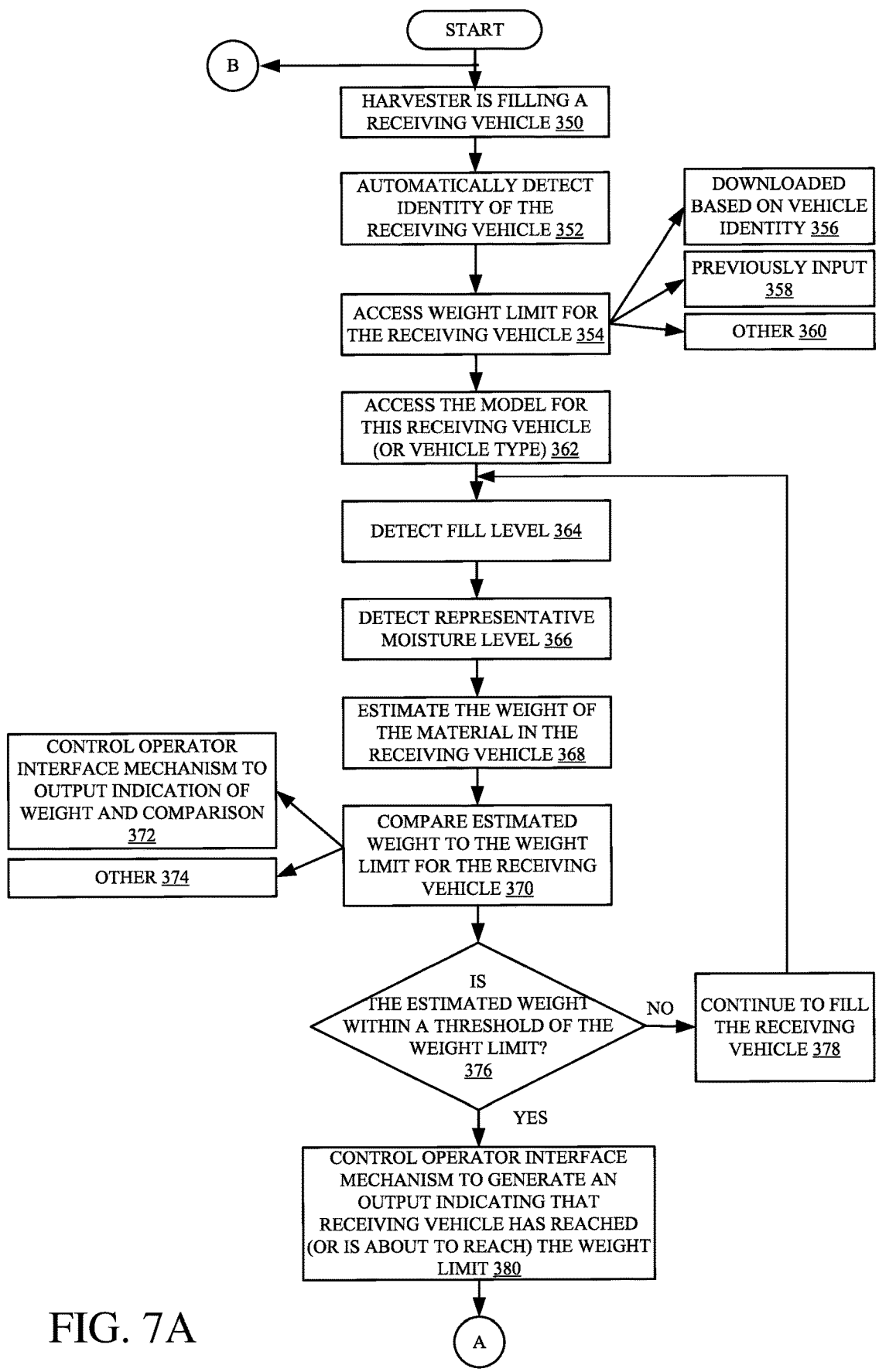
FIGS. 7A and 7B (collectively referred to herein as FIG. 7) show a flow diagram of machine control using estimated load weight.
Figure 7B:
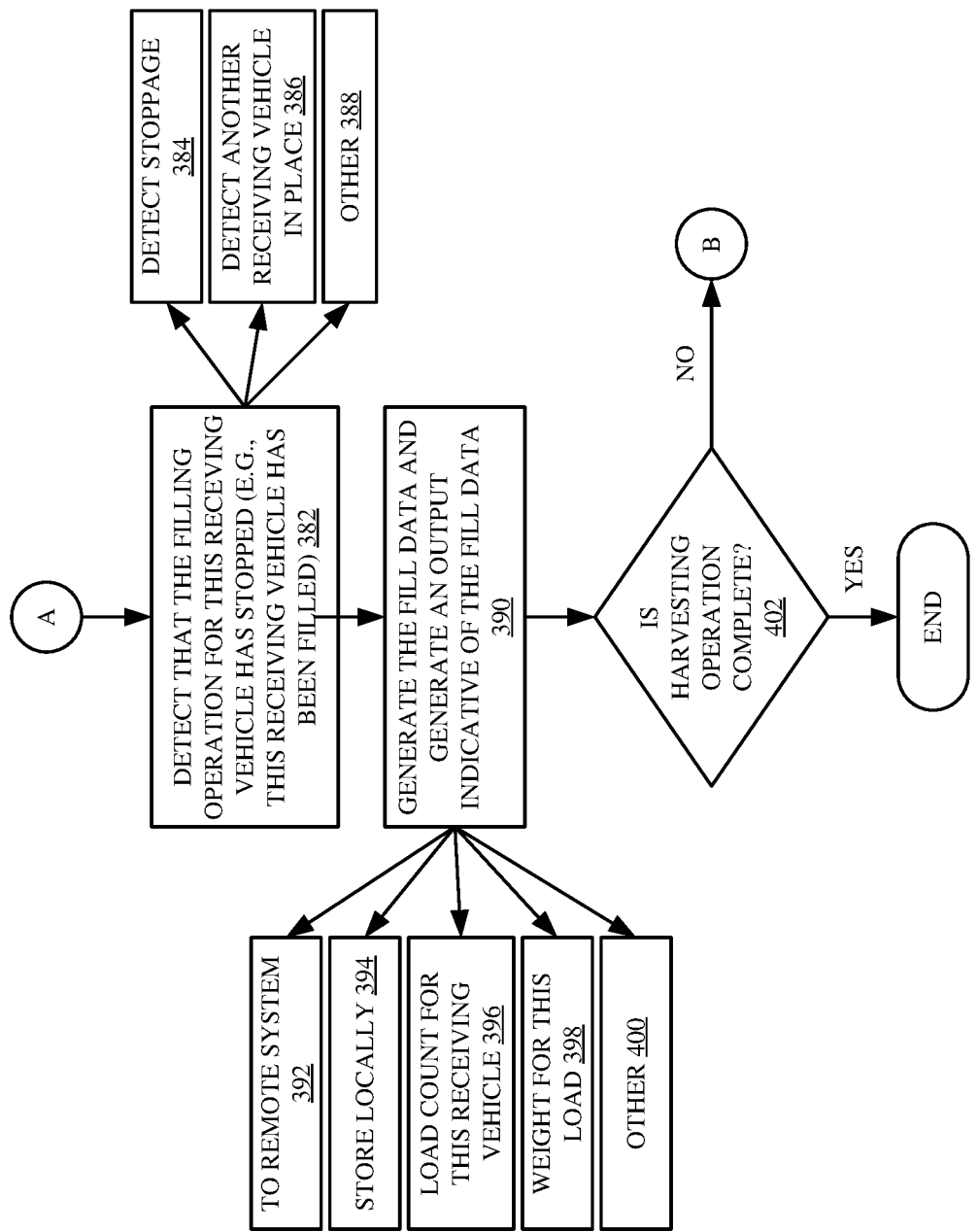

FIGS. 7A and 7B (collectively referred to herein as FIG. 7) show a flow diagram illustrating one example of the operation of harvester 100, once it has a receiving vehicle weight estimation model 176 in place for a receiving vehicle 102 that is receiving material from harvester 100. It is thus assumed that harvester 100 is filling a receiving vehicle 102, as indicated by block 350 in the flow diagram of FIG. 7.

Receiving vehicle identification system 162 then automatically detects the identity of the receiving vehicle 102 that harvester 100 is filling. Automatically detecting the receiving vehicle identity is indicated by block 352 in the flow diagram of FIG. 7.

Weight limit comparison system 212 then accesses the weight limit for the receiving vehicle 102 from receiving vehicle-to-weight limit mappings 174, as indicated by block 354 in the flow diagram of FIG. 7. Again, the weight limit mappings 174 can be downloaded or generated based upon the identity of the receiving vehicle 102, as indicated by block 356, or it can be previously input as indicated by block 358, or the mappings 174 can be accessed in other ways as well, as indicated by block 360.

Model accessing system 208 then accesses the receiving vehicle weight estimation model 176 for this receiving vehicle 102, as indicated by block 362. Fill level detection system 206 then detects the fill level of material inside the receiving vehicle 102 that is currently being filled by harvester 100. Detecting the fill level is indicated by block 364 in the flow diagram of FIG. 7.

Where the model 176 corresponding to the identified receiving vehicle 102 also considers moisture level, then fill control system 164 can also detect a representative moisture level (such as generating a rolling average of values from moisture sensor 192 while receiving vehicle 102 is being loaded) as indicated by block 366.

Weight generation system 210 uses the fill level detected by fill level detection system 206 and the model 176 corresponding to this receiving vehicle 102 and estimates the weight of the material in the receiving vehicle 102, as it is being filled. Estimating the weight of material in the receiving vehicle 102 is indicated by block 368 in the flow diagram of FIG. 7.

Weight limit comparison system 212 then compares the estimated weight received from model 176 and weight generation system 210 to the weight limit for the receiving vehicle 102. Comparing the two weights is indicated by block 370 in the flow diagram of FIG. 7. In one example, as the weight of material in receiving vehicle 102 is being estimated by weight generation system 210 during the filling operation, it can be output on operator interface mechanisms 160. Also, the weight comparison (which may indicate how close the current weight of material in receiving vehicle 102 is to the weight limit for receiving vehicle 102) can also be output on operator interface mechanisms 160. Controlling the operator interface mechanisms 160 to output the indication of the weight of material in receiving vehicle 102 and the result of comparison to the weight limit is indicated by block 372 in the flow diagram of FIG. 7. The estimated weight of material in receiving vehicle 102 can be compared to the weight limit for receiving vehicle 102 in other ways as well, as indicated by block 374.

In one example, weight limit comparison system 212 also determines whether the estimated weight of material in the receiving vehicle 102 is within a threshold level of the weight limit for that receiving vehicle 102, as indicated by block 376. If the estimated weight is not yet within a threshold level of the weight limit, then the fill control system 164 continues to fill the receiving vehicle 102, as indicated by block 378. However, if, at block 376 it is determined that the estimated weight of material in the receiving vehicle 102 is within a predetermined threshold of the receiving vehicle's weight limit, then control signal generator 214 generates control signals to control the operator interface mechanisms 160 to generate an output indicating that the receiving vehicle 102 has reached (or is about to reach) its weight limit. Generating an output indicating that the receiving vehicle 102 has reached (or is about to reach) its weight limit is indicated by block 380 in the flow diagram of FIG. 7.

At some point, when receiving vehicle 102 is filled to a desired level (material weight or material height) either fill control system 164 automatically stops filling the receiving vehicle 102, or operator 138 provides an input to control the controllable subsystems 168 to stop filling the receiving vehicle 102. Fill data generation system 170 can detect that this receiving vehicle 102 has been filled, as indicated by block 382 in the flow diagram of FIG. 7. Detecting that this receiving vehicle 102 has been filled can be performed by detecting that the material conveyance subsystem 218 has been stopped, as indicated by block 384. Detecting that this receiving vehicle 102 has been filled can be detected when receiving vehicle identification system 162 detects that another receiving vehicle is in place adjacent harvester 100, and being filled by harvester 100, as indicated by block 386. Detecting that the receiving vehicle 102 has been filled, and that the filling operation has stopped, can be done in other ways as well, as indicated by block 388.

Fill data generation system 170 then generates the fill data and output generator 236 generates an output indicative of the fill data, as indicated by block 390. As discussed elsewhere, the fill data can be provided to remote system/vehicles 148, as indicated by block 392. The fill data can be stored locally as indicated by block 394. The fill data can include the load count for this receiving vehicle 102 as indicated by block 396, the weight for this load, as indicated by block 398 and a wide variety of other information, as indicated by block 340. As long as the harvesting operation continues, as indicated by block 402, then processing reverts to block 350 where the harvester is filling another receiving vehicle, that vehicle is identified, etc.

It can thus be seen that the present description provides a description that automatically counts fill operations on a per-receiving vehicle-specific basis, or for different types of receiving vehicles. The present system can also estimate the weight of material in the receiving vehicle, compare it to a weight limit, and generate control signals based upon that comparison. These and other items can greatly increase the performance of the agricultural system. It will be noted that the present description can also just as easily be made with respect to construction equipment, such as a cold planar or another vehicle that is filling a receiving vehicle (such as a dump truck) with crushed concrete, asphalt, etc. The description provided with respect to an agricultural harvester is provided for the sake of example only.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. The user interfaces can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which they are displayed is a touch sensitive screen, the mechanisms can be actuated using touch gestures. Also, where the device that displays the mechanisms has speech recognition components, the actuators can be actuated using speech commands.

A number of data stores have also been discussed. It will be noted the data stores can each be broken into multiple data stores. All data stores can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

It will also be noted that the information on map 107 can be output to the cloud.

Figure 8:
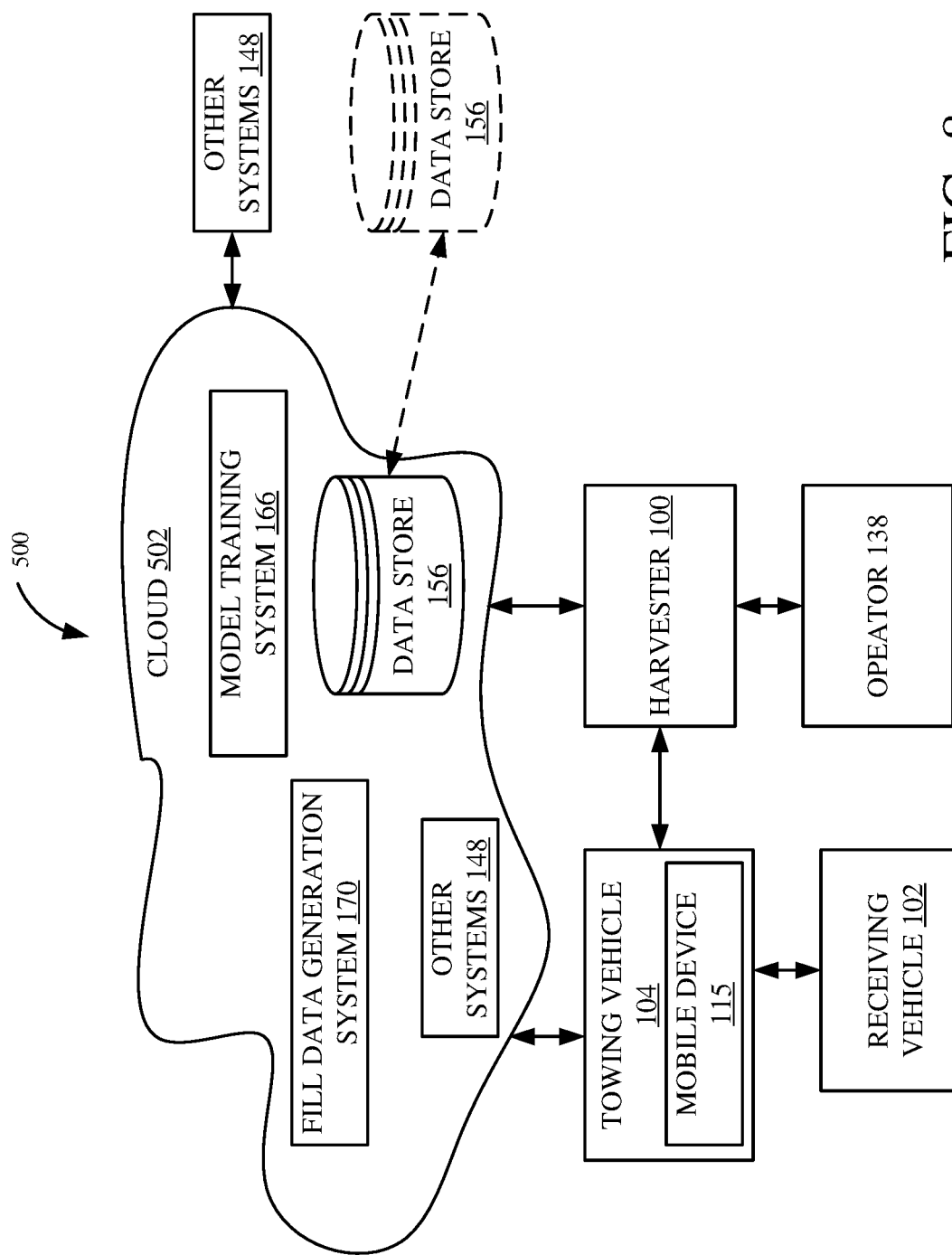
FIG. 8 shows a block diagram of a harvester in a remote server architecture.

FIG. 8 is a block diagram of the material loading system 136, shown in FIG. 4, except that it communicates with elements in a remote server architecture 500. In one example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 1 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, the components and functions can be provided from a conventional server, or they can be installed on client devices directly, or in other ways.

In the example shown in FIG. 8, some items are similar to those shown in FIG. 4 and they are similarly numbered. FIG. 8 specifically shows that other systems 148, systems 166 and 170, and data store 156 can be located at a remote server location 502. Therefore, harvester 100 accesses those systems through remote server location 502.

FIG. 8 also depicts another example of a remote server architecture. FIG. 8 shows that it is also contemplated that some elements of FIG. 4 are disposed at remote server location 502 while others are not. By way of example, data store 156 or other systems 148 can be disposed at a location separate from location 502, and accessed through the remote server at location 502. Regardless of where the remote items are located, they can be accessed directly by harvester 100, through a network (either a wide area network or a local area network), the remote items can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the harvester comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester until the harvester enters a covered location. The harvester, itself, can then send the information to the main network.

It will also be noted that the elements of FIG. 4, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
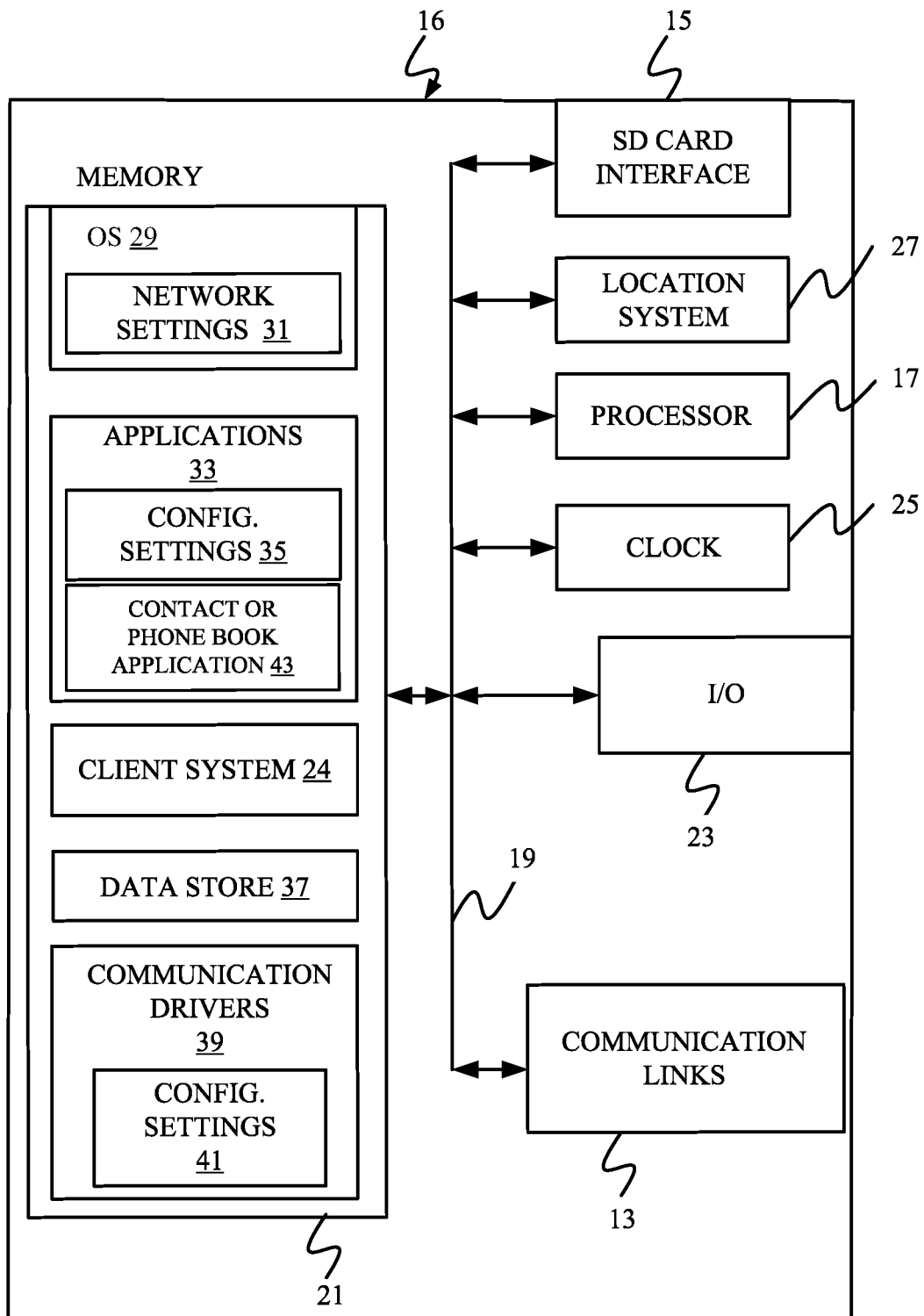
FIGS. 9-11 show examples of mobile devices that can be used in loading vehicles.
Figure 10:
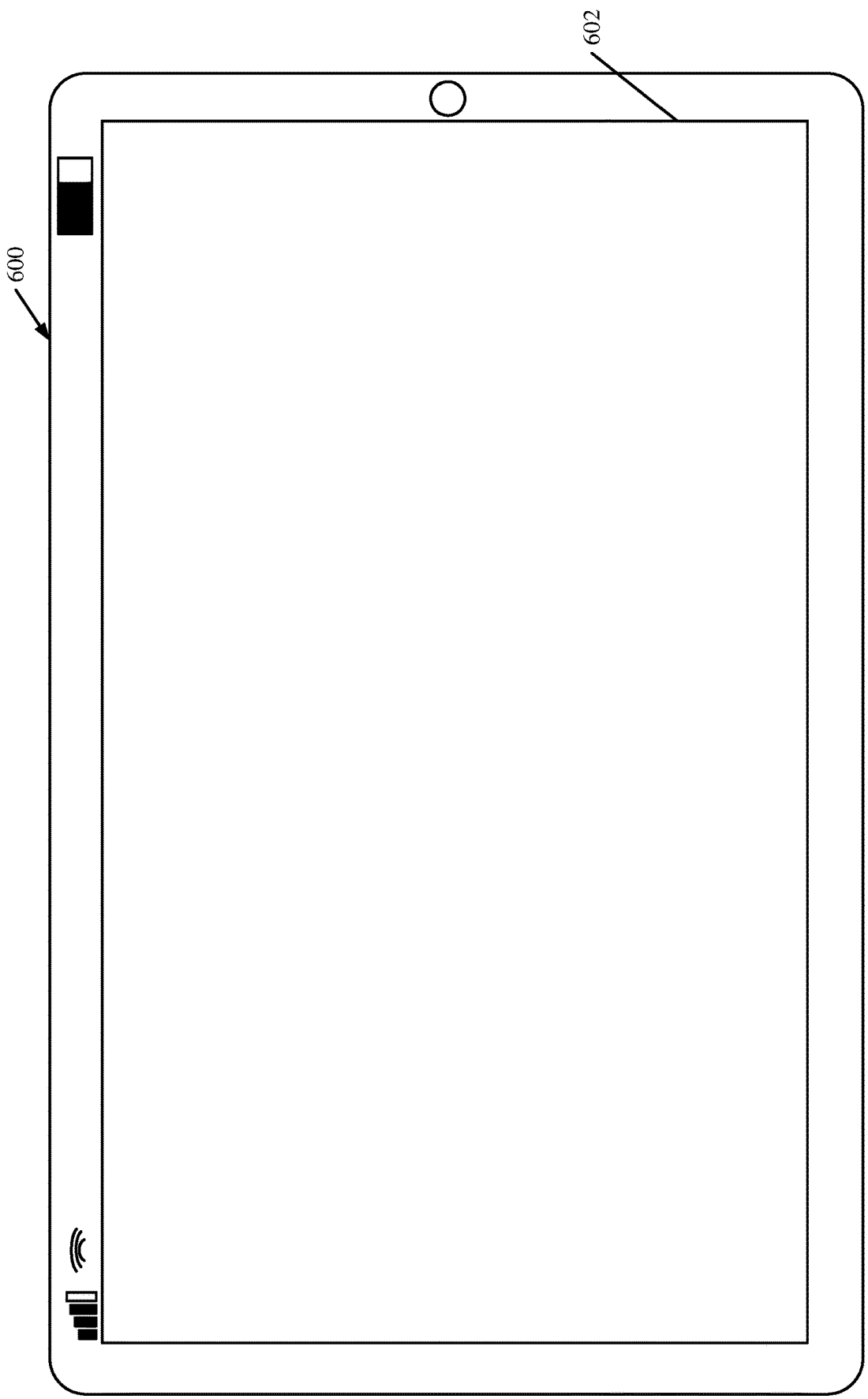
Figure 11:
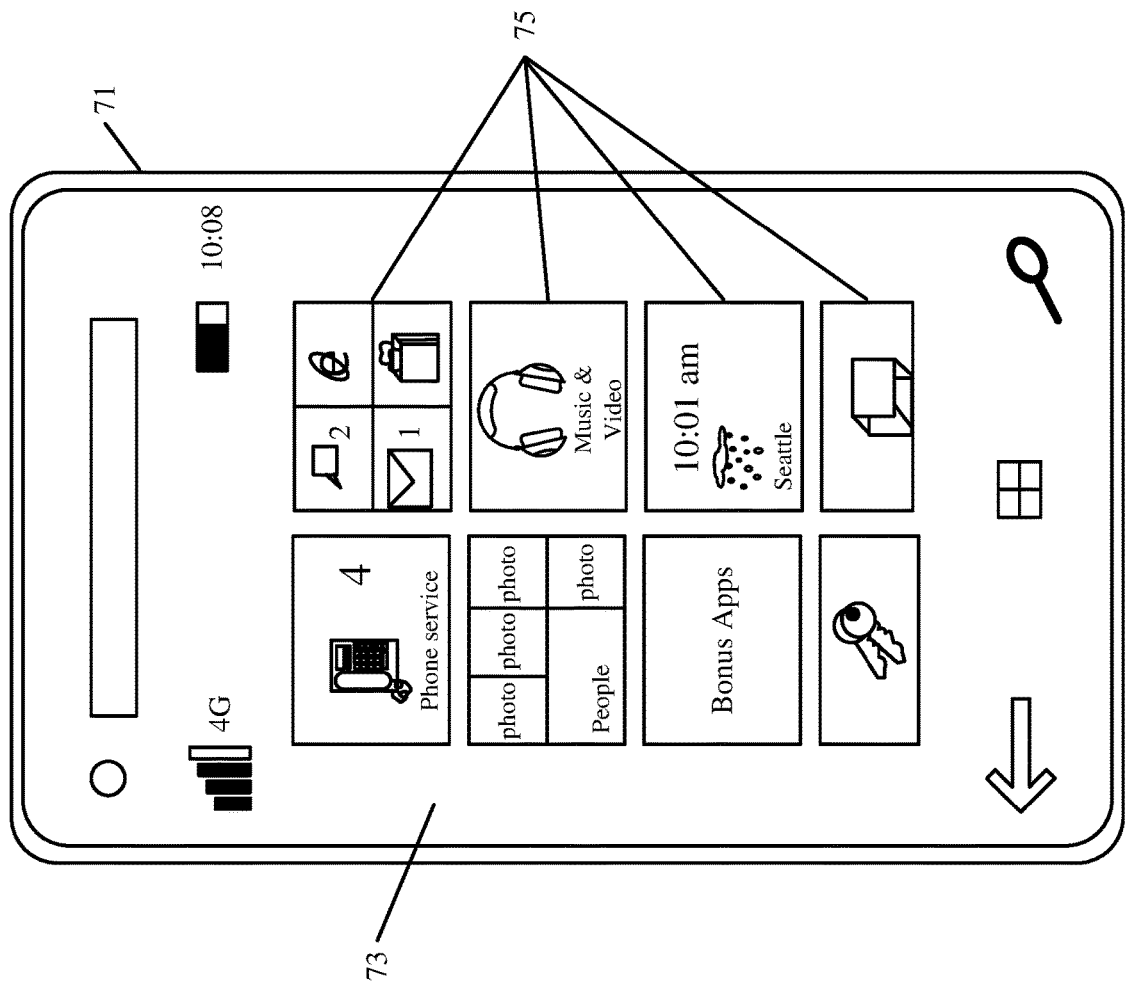

FIG. 9 is a simplified block diagram of one illustrative example of a handheld or mobile computing device that can be used as mobile device 115, or as a user's or client's hand held device 16, in which the present system (or parts of it) can be deployed. For instance, a mobile device can be deployed in the operator compartment of harvester 100 or towing vehicles or semi-tractors for use in generating, processing, or displaying the fill data. FIGS. 9-11 are examples of handheld or mobile devices.

FIG. 9 provides a general block diagram of the components of a client device 16 that can run some components shown in FIG. 4, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. System 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 10 shows one example in which device 16 is a tablet computer 600. In FIG. 10, computer 600 is shown with user interface display screen 602. Screen 602 can be a touch screen or a pen-enabled interface that receives inputs from a pen or stylus. Computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 11 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
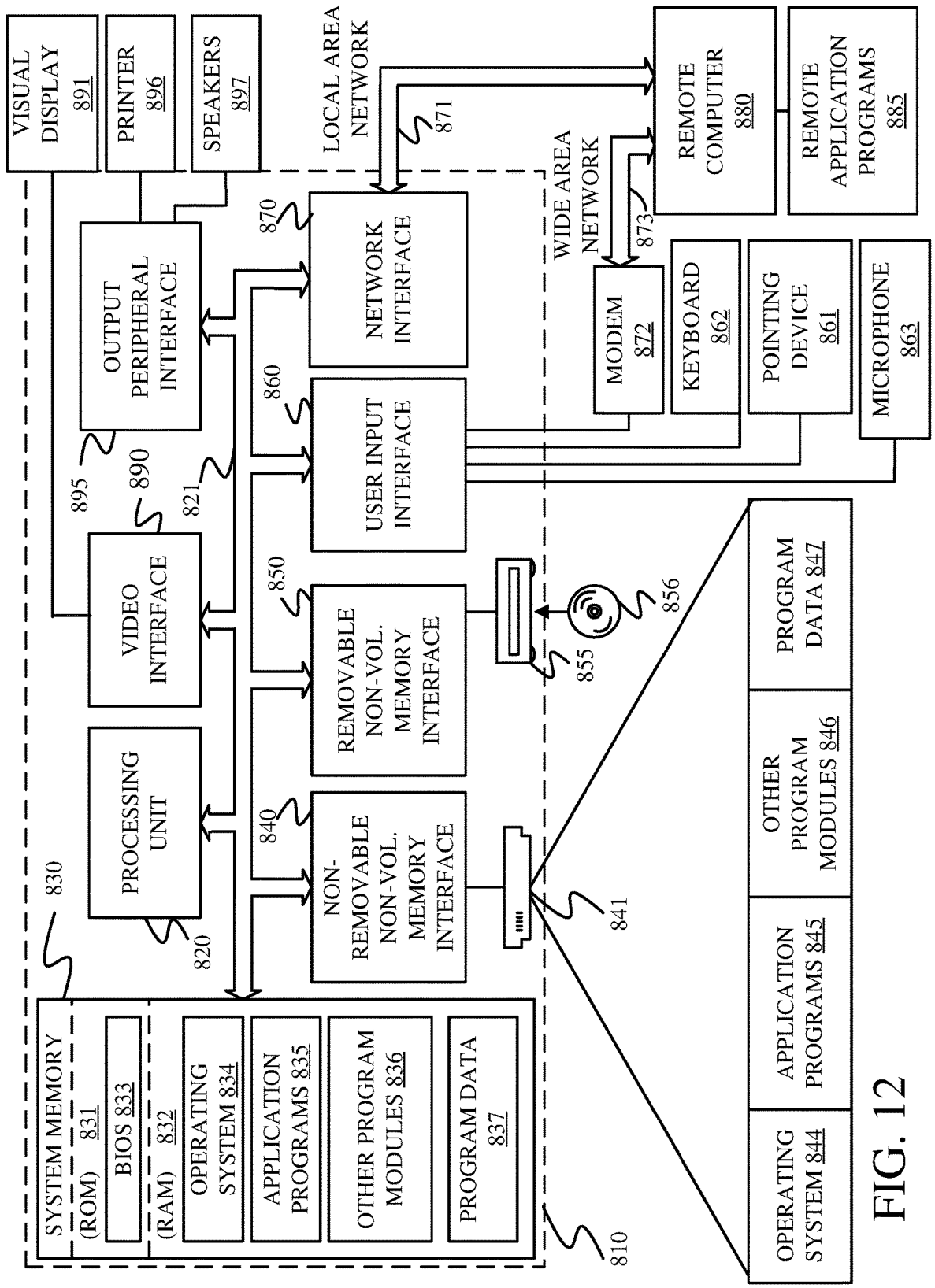
FIG. 12 is a block diagram of a computing environment that can be used in the machines, systems, and architectures shown and discussed with respect to the previous figures.

FIG. 12 is one example of a computing environment in which elements of FIG. 4, or parts of it, (for example) can be deployed. With reference to FIG. 12, an example system for implementing some embodiments includes a computing device in the form of a computer 810 programmed to operate as described herein. Components of computer 810 may include, but are not limited to, a processing unit 820 (which can comprise processors or servers from other FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 4 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 is typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a CAN networking environment, computer 810 uses a CAN bus and bus controller functionality. When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 12 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a material loading system, comprising:
a receiving vehicle identification system that automatically identifies a receiving vehicle that receives material from a material loading vehicle;
a fill level detection system that automatically detects a fill level of the material in the identified receiving vehicle;
a fill data generation system that automatically generates a load count corresponding to the identified receiving vehicle, the load count being indicative of a number of times that the identified receiving vehicle has been filled with material during a load count window; and
an output generator that generates an output control signal to output the load count corresponding to the identified receiving vehicle.

Example 2 is the material loading system of any or all previous examples and further comprising:

a weight generation system configured to automatically generate an estimated weight value indicative of an estimated weight of the material in the identified receiving vehicle based on the identified receiving vehicle and the detected fill level.

Example 3 is the material loading system of any or all previous examples and further comprising:
a model accessing system that identifies a receiving vehicle weight estimation model corresponding to the identified receiving vehicle, and wherein the weight generation system is configured to use the receiving vehicle weight estimation model corresponding to the identified receiving vehicle to generate the estimated weight value corresponding to the material in the identified receiving vehicle.

Example 4 is the material loading system of any or all previous examples wherein the identified receiving vehicle is of a receiving vehicle type and wherein the receiving vehicle weight estimation model comprises:
a vehicle-specific weight estimation model specific to the identified receiving vehicle or the receiving vehicle type.

Example 5 is the material loading system of any or all previous examples wherein the receiving vehicle weight estimation model comprises a function or classifier that correlates the fill level for the identified receiving vehicle to the estimated weight value.

Example 6 is the material loading system of any or all previous examples wherein the fill data generation system comprises:
a load weight generator configured to generate fill data corresponding to the identified receiving vehicle that includes the estimated weight value.

Example 7 is the material loading system of any or all previous examples and further comprising:
a model training system configured to receive, as model training inputs, an identity of the receiving vehicle, the fill level for the receiving vehicle, and a measurement indicative of a measured weight of the material in the receiving vehicle and to train the vehicle-specific weight estimation model based on the model training inputs.

Example 8 is the material loading system of any or all previous examples and further comprising:
a weight limit comparison system configured to obtain a weight limit corresponding to the identified receiving vehicle and automatically perform a comparison to compare the estimated weight value corresponding to the identified receiving vehicle, as the identified receiving vehicle is being loaded with material, to the weight limit corresponding to the identified receiving vehicle and generate a comparison output based on the comparison; and
a control signal generator configured to generate a control signal based on the comparison output.

Example 9 is the material loading system of any or all previous examples wherein the control signal generator is configured to generate a control signal to control an operator interface mechanism to surface an output to an operator indicative of a current estimated weight of material in the receiving vehicle relative to a weight limit for the identified receiving vehicle based on the comparison signal.

Example 10 is the material loading system of any or all previous examples and further comprising:
an image capture device configured to capture an image of a portion of the receiving vehicle and wherein the receiving vehicle identification system comprises an image processing system configured to identify a vehicle-identifying attribute in the image of the receiving vehicle and to identify the receiving vehicle based on the vehicle-identifying attribute.

Example 11 is the material loading system of any or all previous examples wherein the material loading vehicle comprises an agricultural harvester.

Example 12 is a computer implemented method of controlling a material loading system, the computer implemented method comprising:
automatically identifying a receiving vehicle that receives material from a material loading vehicle;
automatically detecting a fill level of the material in the identified receiving vehicle;
automatically generating a load count corresponding to the identified receiving vehicle, the load count being indicative of a number of times that the identified receiving vehicle has been filled with material during a load count window; and
generating an output control signal to output the load count corresponding to the identified receiving vehicle.

Example 13 is the computer implemented method of any or all previous examples and further comprising:
automatically generating an estimated weight value indicative of an estimated weight of the material in the identified receiving vehicle based on the identified receiving vehicle and the detected fill level.

Example 14 is the computer implemented method of any or all previous examples wherein automatically generating an estimated weight value comprises:
identifying a receiving vehicle weight estimation model corresponding to the identified receiving vehicle; and
using the receiving vehicle weight estimation model corresponding to the identified receiving vehicle to generate the estimated weight value corresponding to the material in the identified receiving vehicle.

Example 15 is the computer implemented method of any or all previous examples and further comprising:
generating fill data corresponding to the identified receiving vehicle that includes the estimated weight value.

Example 16 is the computer implemented method of any or all previous examples and further comprising:
training the receiving vehicle weight estimation model based on a set of model training inputs comprising an identity of the receiving vehicle, the fill level for the receiving vehicle, and a measurement indicative of a measured weight of the material in the receiving vehicle.

Example 17 is the computer implemented method of any or all previous examples and further comprising:
obtaining a weight limit corresponding to the identified receiving vehicle;
automatically performing a comparison to compare the estimated weight value corresponding to the identified receiving vehicle, as the identified receiving vehicle is being loaded with material, to the weight limit corresponding to the identified receiving vehicle;
generating a comparison output based on the comparison; and
generating a control signal based on the comparison output.

Example 18 is the computer implemented method of any or all previous examples wherein generating a control signal comprises:
generating the control signal to control an operator interface mechanism to surface an output to an operator indicative of a current estimated weight of material in the receiving vehicle relative to a weight limit for the identified receiving vehicle based on the comparison signal.

Example 19 is the computer implemented method of any or all previous examples automatically identifying a receiving vehicle comprises:
capturing an image of a portion of the receiving vehicle;
performing image processing on the captured image to identify a vehicle-identifying attribute in the image of the receiving vehicle; and
identifying the receiving vehicle based on the vehicle-identifying attribute.

Example 20 is a material loading system comprising:
at least one processor; and
memory storing computer executable instructions which, when executed by the at least one processor, cause the at least one processor to perform steps comprising:
receive an image of a portion of a receiving vehicle that receives material from a material loading vehicle;
performing image processing on the image to automatically identify the receiving vehicle;
automatically detecting a fill level of the material in the identified receiving vehicle;
automatically generating a load count corresponding to the identified receiving vehicle, the load count being indicative of a number of times that the identified receiving vehicle has been filled with material during a load count window;
automatically generating an estimated weight value based on the identified receiving vehicle and the fill level, the estimated weight value being indicative of an estimated weight of the material in the identified receiving vehicle; and
generating an output control signal based on the load count and the estimated weight value.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A material loading system, comprising:
a receiving vehicle identification system that automatically identifies a receiving vehicle that receives material from a material loading vehicle;
a fill level detection system that automatically detects a fill level of the material in the identified receiving vehicle;
a fill data generation system that automatically generates a load count corresponding to the identified receiving vehicle, the load count being indicative of a number of times that the identified receiving vehicle has been filled with material during a load count window; and
an output generator that generates an output control signal to output the load count corresponding to the identified receiving vehicle.

2. The material loading system of claim 1 and further comprising:
a weight generation system configured to automatically generate an estimated weight value indicative of an estimated weight of the material in the identified receiving vehicle based on the identified receiving vehicle and the detected fill level.

3. The material loading system of claim 2 and further comprising:

a model accessing system that identifies a receiving vehicle weight estimation model corresponding to the identified receiving vehicle, and wherein the weight generation system is configured to use the receiving vehicle weight estimation model corresponding to the identified receiving vehicle to generate the estimated weight value corresponding to the material in the identified receiving vehicle.

4. The material loading system of claim 3 wherein the identified receiving vehicle is of a receiving vehicle type and wherein the receiving vehicle weight estimation model comprises:
a vehicle-specific weight estimation model specific to the identified receiving vehicle or the receiving vehicle type.

5. The material loading system of claim 3 wherein the receiving vehicle weight estimation model comprises a function or classifier that correlates the fill level for the identified receiving vehicle to the estimated weight value.

6. The material loading system of claim 2 wherein the fill data generation system comprises:
a load weight generator configured to generate fill data corresponding to the identified receiving vehicle that includes the estimated weight value.

7. The material loading system of claim 4 and further comprising:
a model training system configured to receive, as model training inputs, an identity of the receiving vehicle, the fill level for the receiving vehicle, and a measurement indicative of a measured weight of the material in the receiving vehicle and to train the vehicle-specific weight estimation model based on the model training inputs.

8. The material loading system of claim 2 and further comprising:
a weight limit comparison system configured to obtain a weight limit corresponding to the identified receiving vehicle and automatically perform a comparison to compare the estimated weight value corresponding to the identified receiving vehicle, as the identified receiving vehicle is being loaded with material, to the weight limit corresponding to the identified receiving vehicle and generate a comparison output based on the comparison; and
a control signal generator configured to generate a control signal based on the comparison output.

9. The material loading system of claim 8 wherein the control signal generator is configured to generate a control signal to control an operator interface mechanism to surface an output to an operator indicative of a current estimated weight of material in the receiving vehicle relative to a weight limit for the identified receiving vehicle based on the comparison signal.

10. The material loading system of claim 1 and further comprising:
an image capture device configured to capture an image of a portion of the receiving vehicle and wherein the receiving vehicle identification system comprises an image processing system configured to identify a vehicle-identifying attribute in the image of the receiving vehicle and to identify the receiving vehicle based on the vehicle-identifying attribute.

11. The material loading system of claim 1 wherein the material loading vehicle comprises an agricultural harvester, and the load count window comprises at least one of:
a length of harvesting operation,
a predefined time period,
shift, or
a field.

12. A computer implemented method of controlling a material loading system, the computer implemented method comprising:
automatically identifying a receiving vehicle that receives material from a material loading vehicle;
automatically detecting a fill level of the material in the identified receiving vehicle;
automatically generating a load count corresponding to the identified receiving vehicle, the load count being indicative of a number of times that the identified receiving vehicle has been filled with material during a load count window; and
generating an output control signal to output the load count corresponding to the identified receiving vehicle.

13. The computer implemented method of claim 12 and further comprising:
automatically generating an estimated weight value indicative of an estimated weight of the material in the identified receiving vehicle based on the identified receiving vehicle and the detected fill level.

14. The computer implemented method of claim 13 wherein automatically generating an estimated weight value comprises:
identifying a receiving vehicle weight estimation model corresponding to the identified receiving vehicle; and
using the receiving vehicle weight estimation model corresponding to the identified receiving vehicle to generate the estimated weight value corresponding to the material in the identified receiving vehicle.

15. The computer implemented method of claim 13 and further comprising:
generating fill data corresponding to the identified receiving vehicle that includes the estimated weight value.

16. The computer implemented method of claim 14 and further comprising:
training the receiving vehicle weight estimation model based on a set of model training inputs comprising an identity of the receiving vehicle, the fill level for the receiving vehicle, and a measurement indicative of a measured weight of the material in the receiving vehicle.

17. The computer implemented method of claim 13 and further comprising:
obtaining a weight limit corresponding to the identified receiving vehicle;
automatically performing a comparison to compare the estimated weight value corresponding to the identified receiving vehicle, as the identified receiving vehicle is being loaded with material, to the weight limit corresponding to the identified receiving vehicle;
generating a comparison output based on the comparison; and
generating a control signal based on the comparison output.

18. The computer implemented method of claim 17 wherein generating a control signal comprises:
generating the control signal to control an operator interface mechanism to surface an output to an operator indicative of a current estimated weight of material in the receiving vehicle relative to a weight limit for the identified receiving vehicle based on the comparison signal.

19. The computer implemented method of claim 12 automatically identifying a receiving vehicle comprises:
- capturing an image of a portion of the receiving vehicle;
- performing image processing on the captured image to identify a vehicle-identifying attribute in the image of the receiving vehicle; and
- identifying the receiving vehicle based on the vehicle-identifying attribute.

20. A material loading system comprising:
- at least one processor; and
- memory storing computer executable instructions which, when executed by the at least one processor, cause the at least one processor to perform steps comprising:
  - receive an image of a portion of a receiving vehicle that receives material from a material loading vehicle;
  - performing image processing on the image to automatically identify the receiving vehicle;
  - automatically detecting a fill level of the material in the identified receiving vehicle;
  - automatically generating a load count corresponding to the identified receiving vehicle, the load count being indicative of a number of times that the identified receiving vehicle has been filled with material during a load count window;
  - automatically generating an estimated weight value based on the identified receiving vehicle and the fill level, the estimated weight value being indicative of an estimated weight of the material in the identified receiving vehicle; and
  - generating an output control signal based on the load count and the estimated weight value.

* * * * *